(12) United States Patent
Wei et al.

(10) Patent No.: US 11,882,071 B2
(45) Date of Patent: Jan. 23, 2024

(54) REFERENCE SIGNAL SENDING METHOD, SIGNAL DETECTION METHOD, AND APPARATUS

(71) Applicant: HUAWEI TECHNOLOGIES CO., LTD., Guangdong (CN)

(72) Inventors: Yi Wei, Shenzhen (CN); Xueru Li, Beijing (CN); Bingyu Qu, Beijing (CN); Miao Zhao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/690,738

(22) Filed: Mar. 9, 2022

(65) Prior Publication Data

US 2022/0200760 A1   Jun. 23, 2022

Related U.S. Application Data

(63) Continuation of application No. PCT/CN2019/105198, filed on Sep. 10, 2019.

(51) Int. Cl.
*H04L 5/00* (2006.01)

(52) U.S. Cl.
CPC .......... *H04L 5/0051* (2013.01); *H04L 5/0007* (2013.01); *H04L 5/0062* (2013.01)

(58) Field of Classification Search
CPC ... H04L 27/261; H04L 5/0007; H04L 5/0051; H04L 5/0062
See application file for complete search history.

(56) References Cited

U.S. PATENT DOCUMENTS

| 8,750,230 | B2 | 6/2014 | Sorrentino | |
|---|---|---|---|---|
| 2010/0173625 | A1* | 7/2010 | Noh | H04W 74/085 455/422.1 |
| 2013/0039285 | A1* | 2/2013 | Sorrentino | H04W 72/51 370/329 |
| 2014/0376356 | A1 | 12/2014 | Park et al. | |
| 2016/0366717 | A1 | 12/2016 | Yang et al. | |

(Continued)

FOREIGN PATENT DOCUMENTS

| CN | 104618985 A | 5/2015 |
|---|---|---|
| CN | 104853339 A | 8/2015 |
| WO | 2018171754 A1 | 9/2018 |

(Continued)

OTHER PUBLICATIONS

Extended European Search Report issued in European Application No. 19944848.1 dated Sep. 5, 2022, 9 pages.

(Continued)

*Primary Examiner* — Mansour Oveissi
(74) *Attorney, Agent, or Firm* — Fish & Richardson P.C.

(57) ABSTRACT

The present disclosure relates to reference signal sending methods, signal detection methods, and apparatus. One example method includes determining an initial seed parameter of a pseudo-random sequence, and generating the pseudo-random sequence based on the initial seed parameter, where the initial seed parameter is determined based on attribute information of a terminal device, determining a cyclic shift value based on the pseudo-random sequence, and determining a reference signal based on the cyclic shift value, and sending the reference signal to a network device.

16 Claims, 4 Drawing Sheets

(56) References Cited

U.S. PATENT DOCUMENTS

2019/0149298 A1  5/2019 Yang
2021/0377929 A1  12/2021 Li et al.

FOREIGN PATENT DOCUMENTS

WO  2019096217 A1  5/2019
WO  2019148738 A1  8/2019

OTHER PUBLICATIONS

MediaTek Inc., "Interference management in NR," 3GPP TSG RAN WG1 Meeting #88bis, R1-1704450, Spokane, USA, Apr. 3-7, 2017, 26 pages.
PCT International Search Report and Written Opinion issued in International Application No. PCT/CN2019/105198 dated May 28, 2020, 21 pages (with English translation).

* cited by examiner

REFERENCE SIGNAL SENDING METHOD, SIGNAL DETECTION METHOD, AND APPARATUS

CROSS-REFERENCE TO RELATED APPLICATIONS

This application is a continuation of International Application No. PCT/CN2019/105198, filed on Sep. 10, 2019, the disclosure of which is hereby incorporated by reference in its entirety.

TECHNICAL FIELD

This application relates to the field of wireless communication technologies, and in particular, to a reference signal sending method, a signal detection method, and an apparatus.

BACKGROUND

In systems such as long term evolution (long term evolution, LTE) and new radio (new radio, NR), a sequence of uplink reference signals such as an uplink demodulation reference signal (demodulation reference signal, DMRS) and an uplink sounding reference signal (sounding reference signal, SRS) is a sequence generated by using a base sequence (Base Sequence). The base sequence may be a sequence generated by using a ZC (Zadoff-Chu) sequence, for example, is the ZC sequence or a sequence generated by performing cyclic shift on the ZC sequence.

For a same base sequence, different reference signals may be obtained by using different cyclic shift values. In a same cell, a base station may allocate different cyclic shift values to different terminal devices to ensure orthogonality between reference signals sent by the different terminal devices. In this way, no interference is caused between the reference signals sent by the different terminal devices. However, for different base sequences, neither interference between reference signals obtained by using a same cyclic shift value nor interference between reference signals obtained by using different cyclic shift values is 0. In other words, when different terminal devices send, on a same time-frequency resource, reference signals obtained based on different base sequences, the reference signals interfere with each other.

For randomize interference between a plurality of reference signals that are obtained based on different base sequences and that are sent on a same time-frequency resource in a cell, a cyclic shift hopping (cyclic shift hopping) technology is introduced.

However, in a current technology, when the cyclic shift hopping technology is used for all terminal devices in a cell, a same uplink cyclic shift hopping pattern is used. Consequently, interference between reference signals of any two terminal devices remains unchanged, and therefore, the interference cannot be randomized, and channel time domain filtering performance deteriorates.

SUMMARY

Implementations of this application are to provide a reference signal sending method, a signal detection method, and an apparatus, to resolve a problem of how to reduce interference between reference signals sent by terminal devices.

According to a first aspect, an embodiment of this application provides a reference signal sending method, including: determining an initial seed parameter of a pseudo-random sequence, and generating the pseudo-random sequence based on the initial seed parameter, where the initial seed parameter is determined based on attribute information of a terminal device; determining a cyclic shift value based on the pseudo-random sequence, and determining a reference signal based on the cyclic shift value; and sending the reference signal to a network device.

According to a second aspect, an embodiment of this application provides a signal detection method, including: determining an initial seed parameter of a pseudo-random sequence, and generating the pseudo-random sequence based on the initial seed parameter, where the initial seed parameter is determined based on attribute information of a terminal device; determining a cyclic shift value based on the pseudo-random sequence, and determining a reference signal based on the cyclic shift value; and detecting a signal from the terminal device by using the reference signal.

In the foregoing method procedure, the initial seed parameter of the pseudo-random sequence used for determining the cyclic shift value is determined based on the attribute information of the terminal device. The attribute information of the terminal device is information specific to the terminal device, and therefore, pseudo-random sequences used by different terminal devices to determine cyclic shift values are different. In this method, a difference between cyclic shift values used by any two terminal devices in a cell to determine reference signals can be randomized. Further, interference between reference signals sent by the terminal devices can be reduced, the interference is randomized, and channel time domain filtering performance is improved.

Based on the First Aspect or the Second Aspect:

In a possible implementation method, the attribute information includes a root indicator of a ZC sequence used for determining the reference signal.

In a possible implementation method, the attribute information includes a sequence identifier of the reference signal.

In a possible implementation method, the cyclic shift value α determined based on the pseudo-random sequence meets the following formula:

$$\alpha = \frac{2\pi}{Z}((\alpha_{init} + n_{cs}(n_{s,f}^{\mu}, l)) \bmod Z),$$

where
$n_{cs}(n_{s,f}^{\mu}, l) = \Sigma_{m=0}^{T-1} 2^m c(T \cdot N_{symb}^{slot} n_{s,f}^{\mu} + T \cdot l + m)$, where m=0, 1, 2, . . . , T−1; $n_{s,f}^{\mu}$ is a slot number, in a current system frame, of a slot in which the reference signal is sent; $N_{symb}^{slot}$ is a quantity of orthogonal frequency division multiplexing OFDM symbols in one slot; l is a symbol number, in a current slot, of a symbol in which the reference signal is sent, and $0 \leq l \leq N_{symb}^{slot} - 1$, where l=0 corresponds to a first symbol in the current slot; Z is a positive integer; $\alpha_{init}$ is a predefined initial cyclic shift value or an initial cyclic shift value configured by the network device; T is a positive integer; and c(•) is the pseudo-random sequence.

In the foregoing method, cyclic shift values of reference signals sent by terminal devices in a same system frame can be randomized, so that interference, in the same system frame, between any two terminal devices that determine reference signals by using different ZC sequences can be randomized. In this way, time domain filtering performance for the reference signal is improved, and channel estimation accuracy is improved.

In a possible implementation method, the cyclic shift value α determined based on the pseudo-random sequence meets the following formula:

$$\alpha = \frac{2\pi}{Z}((\alpha_{init} + n_{cs}(n_{SRS}, l)) \bmod Z),$$

where $n_{cs}(n_{SRS}) = \sum_{m=0}^{T-1} 2^m c(Tn_{SRS}+m)$, where m=0, 1, 2, . . . , T−1; $n_{SRS}$ is a counting value of a reference signal counter; Z is a positive integer; $\alpha_{init}$ is a predefined initial cyclic shift value or an initial cyclic shift value configured by the network device; T is a positive integer; and c(•) is the pseudo-random sequence.

In the foregoing method, cyclic shift values of reference signals sent by the terminal device on a same frequency domain resource for two or more consecutive times can be randomized, so that interference between reference signals sent twice or a plurality of times on a same time-frequency resource by any two terminal devices that determine the reference signals by using different ZC sequences can be randomized. In this way, time domain filtering performance for the reference signal is improved, and channel estimation accuracy is improved.

In a possible implementation method, the cyclic shift value α determined based on the pseudo-random sequence meets the following formula:

$$\alpha = \frac{2\pi}{Z}\left((\alpha_{init} + n_{cs}(N_{slot}^{frame,\mu}, n_f, n_{s,f}^{\mu}, L, T_{SRS})) \bmod Z\right), \text{ where}$$

$$n_{cs}(N_{slot}^{frame,\mu}, n_f, n_{s,f}^{\mu}, L, T_{SRS}) = \sum_{m=0}^{T-1} 2^m c\left(T\left\lfloor \frac{N_{slot}^{frame,\mu} n_f + n_{s,f}^{\mu} - L}{T_{SRS}} \right\rfloor + m\right),$$

where m=0, 1, 2, . . . , T−1; $n_{s,f}^{\mu}$ is a slot number, in a current system frame, of a slot in which the reference signal is sent; $n_f$ is a system frame number; $N_{slot}^{frame,\mu}$ is a quantity of slots in each system frame; $T_{SRS}$ is a reference signal sending cycle; L is an integer; Z is a positive integer; $\alpha_{init}$ is a predefined initial cyclic shift value or an initial cyclic shift value configured by the network device; T is a positive integer; and c(•) is the pseudo-random sequence.

In the foregoing method, cyclic shift values of reference signals sent by the terminal device in any two reference signal sending cycles can be randomized, so that interference between reference signals of any two terminal devices that determine the reference signals by using different ZC sequences can be randomized. In this way, time domain filtering performance for the reference signal is improved, and channel estimation accuracy is improved.

In a possible implementation method, the cyclic shift value α determined based on the pseudo-random sequence meets the following formula:

$$\alpha = \frac{2\pi}{Z}\left((\alpha_{init} + n_{cs}(N_{slot}^{frame,\mu}, n_f, n_{s,f}^{\mu}, l)) \bmod Z\right),$$

where $n_{cs}(N_{slot}^{frame,\mu}, n_f, n_{s,f}^{\mu}, l) = \sum_{m=0}^{T-1} 2^m c(TS(N_{slot}^{frame,\mu} n_f + n_{s,f}^{\mu}) + Tl + m)$, where m=0, 1, 2, . . . , T−1; $n_{s,f}^{\mu}$ is a slot number, in a current system frame, of a slot in which the reference signal is sent; $n_f$ is a system frame number; $N_{slot}^{frame,\mu}$ is a quantity of slots in each system frame; l is a symbol number, in a current slot, of a symbol in which the reference signal is sent, and $0 \le l \le N_{symb}^{slot}-1$, where l=0 corresponds to a first symbol in the current slot; Z is a positive integer; $\alpha_{init}$ is a predefined initial cyclic shift value or an initial cyclic shift value configured by the network device; T is a positive integer; S is a positive integer; and c(•) is the pseudo-random sequence.

In the foregoing method, cyclic shift values of reference signals sent by the terminal device in any two or more symbols can be randomized, so that interference between reference signals sent in any two or more symbols by any two terminal devices that determine the reference signals by using different ZC sequences can be randomized. In this way, time domain filtering performance for the reference signal is improved, and channel estimation accuracy is improved.

In a possible implementation method, Z is $n_{RS}^{cs, max}$, and $n_{RS}^{cs, max}$ is a maximum cyclic shift value.

According to a third aspect, this application further provides a communication apparatus, and the communication apparatus can implement any method provided in the first aspect or the second aspect. The communication apparatus may be implemented by hardware, or may be implemented by hardware by executing corresponding software. The hardware or software includes one or more units or units corresponding to the foregoing function.

In a possible implementation, the communication apparatus includes a processor, and the processor is configured to support the communication apparatus in performing a corresponding function of the terminal device or the network device in the foregoing method. The communication apparatus may further include a memory, and the memory may be coupled to the processor, and stores program instructions and data that are necessary for the communication apparatus. Optionally, the communication apparatus further includes a communication interface, and the communication interface is configured to support communication between the communication apparatus and a device such as a second device.

In a possible implementation, the communication apparatus includes corresponding functional units, respectively configured to implement the steps in the foregoing method. The function may be implemented by hardware, or may be implemented by hardware executing corresponding software. The hardware or the software includes one or more units corresponding to the foregoing function.

In a possible implementation, a structure of the communication apparatus includes a processing unit and a communication unit. These units may perform corresponding functions in the foregoing method example. For details, refer to the descriptions in the method provided in the first aspect or the second aspect. Details are not described herein again.

According to a fourth aspect, this application further provides a reference signal sending method, including: determining a cyclic shift value, where the cyclic shift value is determined based on a first frequency hopping parameter, the first frequency hopping parameter is determined from a first pattern based on information about a first time unit, and the first pattern includes at least two frequency hopping parameters; the cyclic shift value is determined based on a first cyclic shift step and the information about the first time unit; or the cyclic shift value is determined based on a first initial cyclic shift step, a first cyclic shift step gap, and the information about the first time unit, where the information about the first time unit includes a number of a system frame in which the first time unit is located and/or a number of a slot in which the first time unit is located, and the first time unit is a time unit for sending a reference signal; and determining the reference signal based on the cyclic shift value, and sending the reference signal to a network device in the first time unit.

According to a fifth aspect, this application further provides a signal detection method, including: determining a cyclic shift value of a reference signal, where the cyclic shift value is determined based on a first frequency hopping parameter, the first frequency hopping parameter is determined from a first pattern based on information about a first time unit, and the first pattern includes at least two frequency hopping parameters; the cyclic shift value is determined based on a first cyclic shift step and the information about the first time unit; or the cyclic shift value is determined based on a first initial cyclic shift step, a first cyclic shift step gap, and the information about the first time unit, where the information about the first time unit includes a number of a system frame in which the first time unit is located and/or a number of a slot in which the first time unit is located, and the first time unit is a time unit for sending the reference signal; determining the reference signal based on the cyclic shift value; and detecting a signal from a terminal device by using the reference signal.

In the foregoing method procedure, the cyclic shift value is determined based on a parameter such as the first frequency hopping parameter, and parameters such as the first frequency hopping parameter that are used by different terminal devices to determine cyclic shift values are different. In this method, a difference between cyclic shift values used by any two terminal devices in a cell to determine reference signals can be randomized. Further, interference between reference signals sent by the terminal devices can be reduced, the interference is randomized, and channel time domain filtering performance is improved.

Based on the fourth aspect or the fifth aspect:

In a possible implementation, the first pattern is determined from X patterns, and X is a positive integer; or the first cyclic shift step is determined from Z cyclic shift steps, and Z is a positive integer; or the first initial cyclic shift step is determined from Z initial cyclic shift steps, and the first cyclic shift step gap is determined from Z cyclic shift step gaps.

In a possible implementation method, the first pattern is determined from X patterns according to first indication information, and the first indication information is sent by the network device to the terminal device; or the first cyclic shift step is determined from Z cyclic shift steps according to second indication information, and the second indication information is sent by the network device to the terminal device; or the first initial cyclic shift step is determined from Z initial cyclic shift steps according to third indication information, the third indication information is sent by the network device to the terminal device, the first cyclic shift step gap is determined from Z cyclic shift step gaps according to fourth indication information, and the fourth indication information is sent by the network device to the terminal device.

In a possible implementation method, the cyclic shift value is determined based on a first cyclic shift interval, the first cyclic shift interval is determined from the first pattern based on the information about the first time unit, the information about the first time unit includes the number of the system frame in which the first time unit is located and a slot number, in a current system frame, of the slot in which the first time unit is located, and the cyclic shift value α is determined based on λ, where λ meets the following formula:

$$\lambda = \frac{2\pi}{Z}\left(\left(\alpha_{init} + \beta \left\lfloor \frac{N_{slot}^{frame,\mu} n_f + n_{s,f}^{\mu} - L}{T_{SRS}} \right\rfloor_{mod\ Y}\right) mod\ Z\right), \text{ where}$$

$$\beta \left\lfloor \frac{N_{slot}^{frame,\mu} n_f + n_{s,f}^{\mu} - L}{T_{SRS}} \right\rfloor_{mod\ Y}$$

is the first cyclic shift interval; $N_{slot}^{frame,\ \mu}$ is a quantity of slots in each system frame; $n_f$ is a system frame number; $n_{s,\ f}^{\mu}$ is a slot number, in the current system frame, of a slot in which the reference signal is sent; L is an integer; $T_{SRS}$ is a reference signal sending cycle; Z is a positive integer; and $\alpha_{init}$ is a predefined initial cyclic shift value or an initial cyclic shift value configured by the network device.

In a possible implementation method, the cyclic shift value is determined based on the first cyclic shift step and the information about the first time unit, the information about the first time unit includes the number of the system frame in which the first time unit is located and a slot number, in a current system frame, of the slot in which the first time unit is located, and the cyclic shift value α is determined based on λ, where λ meets the following formula:

$$\lambda = \frac{2\pi}{Z}\left(\left(\alpha_{init} + \Delta hopping \times \left\lfloor \frac{N_{slot}^{frame,\mu} n_f + n_{s,f}^{\mu} - L}{T_{SRS}} \right\rfloor\right) mod\ Z\right),$$

where

Δhopping is the first cyclic shift step; $N_{slot}^{frame,\ \mu}$ is a quantity of slots in each system frame; $n_f$ is a system frame number; $n_{s,\ f}^{\mu}$ is a slot number, in the current system frame, of a slot in which the reference signal is sent; L is an integer; $T_{SRS}$ is a reference signal sending cycle; Z is a positive integer; and $\alpha_{init}$ is a predefined initial cyclic shift value or an initial cyclic shift value configured by the network device.

In a possible implementation method, the cyclic shift value is determined based on the first initial cyclic shift step, the first cyclic shift step gap, and the information about the first time unit, the information about the first time unit includes the number of the system frame in which the first time unit is located and a slot number, in a current system frame, of the slot in which the first time unit is located, and the cyclic shift value α is determined based on λ, where λ meets the following formula:

$$\lambda = \frac{2\pi}{Z}\left(\left(\alpha_{init} + \Delta h_{init} \times N_{T_{SRS}} + \Delta h_{gap} \times \frac{N_{T_{SRS}} \times (N_{T_{SRS}} - 1)}{2}\right) mod\ Z\right),$$

$$\text{where } N_{T_{SRS}} = \left\lfloor \frac{N_{slot}^{frame,\mu} n_f + n_{s,f}^{\mu} - L}{T_{SRS}} \right\rfloor$$

$N_{slot}^{frame,\ \mu}$ is a quantity of slots in each system frame; $n_f$ is a system frame number; $n_{s,\ f}^{\mu}$ is a slot number, in the current system frame, of a slot in which the reference signal is sent; L is an integer; $\Delta h_{init}$ is the first initial cyclic shift step; $\Delta h_{gap}$ is the first cyclic shift step gap; Z is a positive integer; $\alpha_{init}$ is a predefined initial cyclic shift value or an initial cyclic shift value configured by the network device; and $T_{SRS}$ is a reference signal sending cycle.

In a possible implementation method, Z is $n_{RS}^{cs,\ max}$, and $n_{RS}^{cs,\ max}$ is a maximum cyclic shift value.

According to a sixth aspect, this application further provides a communication apparatus, and the communication apparatus can implement any method provided in the fourth aspect or the fifth aspect. The communication apparatus may be implemented by hardware, or may be implemented by hardware by executing corresponding software. The hardware or software includes one or more units or units corresponding to the foregoing function.

In a possible implementation, the communication apparatus includes a processor, and the processor is configured to support the communication apparatus in performing a corresponding function of the terminal device or the network device in the foregoing method. The communication apparatus may further include a memory, and the memory may be coupled to the processor, and stores program instructions and data that are necessary for the communication apparatus. Optionally, the communication apparatus further includes a communication interface, and the communication interface is configured to support communication between the communication apparatus and a device such as a second device.

In a possible implementation, the communication apparatus includes corresponding functional units, respectively configured to implement the steps in the foregoing method. The function may be implemented by hardware, or may be implemented by hardware executing corresponding software. The hardware or the software includes one or more units corresponding to the foregoing function.

In a possible implementation, a structure of the communication apparatus includes a processing unit and a communication unit. These units may perform corresponding functions in the foregoing method example. For details, refer to the descriptions in the method provided in the fourth aspect or the fifth aspect. Details are not described herein again.

According to a seventh aspect, this application provides a communication apparatus, including a processor and a memory. The memory is configured to store computer-executable instructions, and when the apparatus runs, the processor executes the computer-executable instructions stored in the memory, so that the apparatus performs the methods in the foregoing aspects.

According to an eighth aspect, this application provides a communication apparatus, including a unit or a means (means) configured to perform the steps in the foregoing aspects.

According to a ninth aspect, this application provides a communication apparatus, including a processor and a communication interface, where the processor is configured to communicate with another apparatus by using the communication interface, and perform the methods in the foregoing aspects. There are one or more processors.

According to a tenth aspect, this application provides a communication apparatus, including a processor, configured to be connected to at least one memory, and configured to invoke a program stored in the at least one memory to perform the methods in the foregoing aspects. The at least one memory may be located inside the apparatus, or may be located outside the apparatus. In addition, there are one or more processors.

According to an eleventh aspect, this application further provides a computer-readable storage medium. The computer-readable storage medium stores instructions. When the instructions are run on a computer, the computer is enabled to perform the methods in the foregoing aspects.

According to a twelfth aspect, this application further provides a computer program product including instructions. When the computer program product runs on a computer, the computer is enabled to perform the methods in the foregoing aspects.

According to a thirteenth aspect, this application further provides a chip system. The chip system includes a processor, configured to perform the methods according to the foregoing aspects.

According to a fourteenth aspect, this application further provides a communication system, including a terminal device configured to perform any method according to the first aspect and a network device configured to perform any method according to the second aspect.

According to a fifteenth aspect, this application further provides a communication system, including a terminal device configured to perform any method according to the fourth aspect and a network device configured to perform any method according to the fifth aspect.

DESCRIPTION OF EMBODIMENTS

Figure 1:
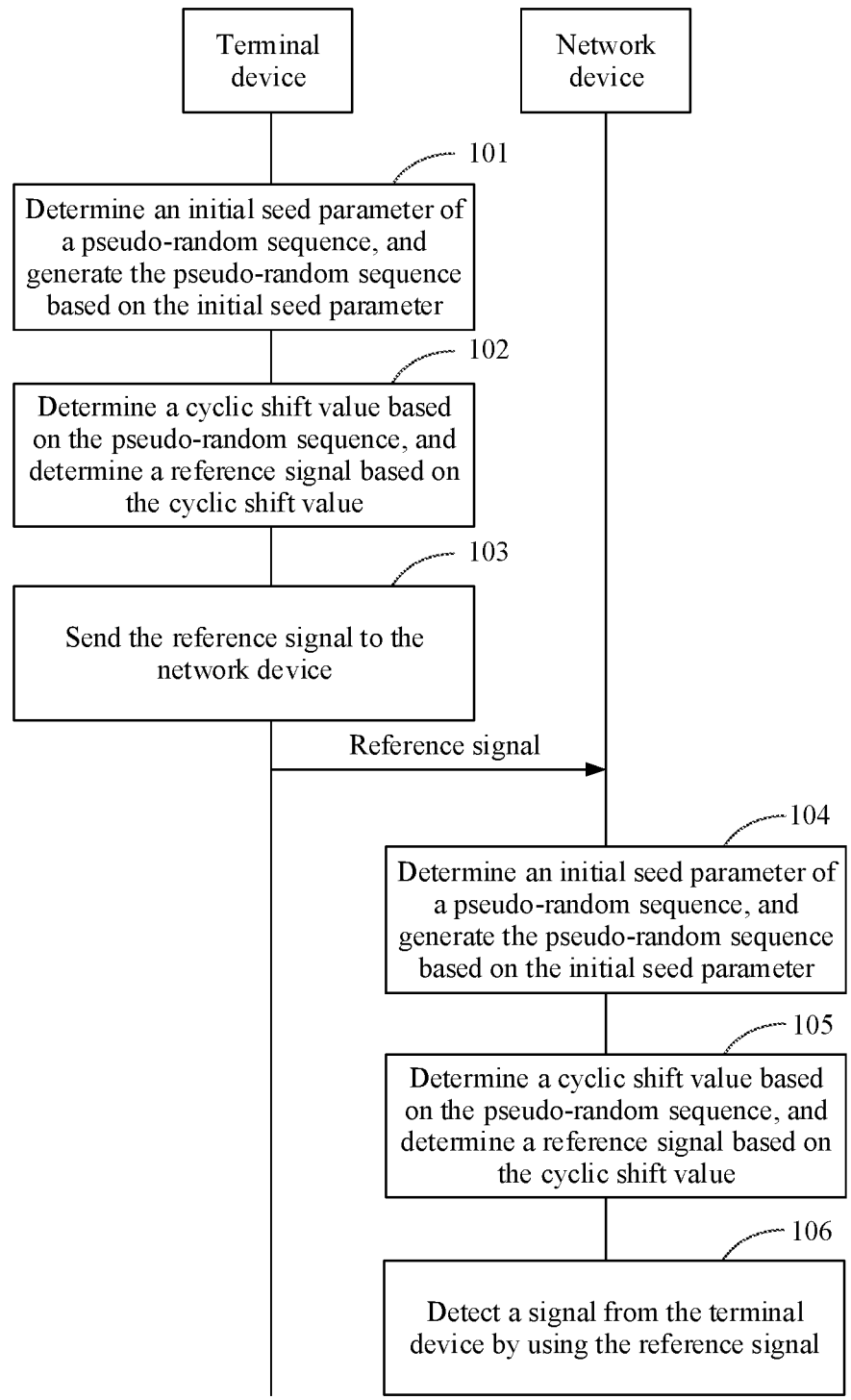
FIG. 1 is a schematic flowchart of a reference signal transmission method according to an embodiment of this application.

The following further describes in detail embodiments of this application with reference to the accompanying drawings.

The embodiments of this application may be applied to various mobile communication systems, for example, a new radio (new radio, NR) system, a long term evolution (long term evolution, LTE) system, a long term evolution advanced (advanced long term evolution, LTE-A) system, a universal mobile telecommunications system (universal mobile telecommunications system, UMTS), an evolved long term evolution (evolved long term evolution, LTE) system, and another communication system such as a future communication system. This is not limited herein.

A terminal device in the embodiments of this application may be a device that has a wireless transceiver function or a chip that can be disposed in any device, or may be referred to as user equipment (user equipment, UE), an access terminal, a subscriber unit, a subscriber station, a mobile station, a remote station, a remote terminal, a mobile device, a user terminal, a wireless communication device, a user agent, a user apparatus, or the like. The terminal device in the embodiments of this application may be a mobile phone (mobile phone), a tablet computer (Pad), a computer having a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like.

A network device may be a wireless access device in various standards, such as an evolved NodeB (evolved NodeB, eNB), a radio network controller (radio network controller, RNC) or a NodeB (NodeB, NB), a base station controller (base station controller, BSC), a base transceiver station (base transceiver station, BTS), a home NodeB (for example, home evolved NodeB, or home NodeB, HNB), a baseband unit (baseband unit, BBU), an access point (access point, AP) in a wireless fidelity (wireless fidelity, WIFI) system, a wireless relay node, a wireless backhaul node, or a transmission point (transmission and reception point, TRP, or transmission point, TP), or may be a gNB or a transmission point (TRP or TP) in a 5G (NR) system, or one antenna panel or a group of antenna panels (including a plurality of antenna panels) of a base station in the 5G system, or may be a network node such as a baseband unit that forms a gNB or a transmission point, or a DU in a central unit-distributed unit (central unit-distributed, CU-DU) architecture.

A network architecture and a service scenario described in the embodiments of this application are intended to describe the technical solutions in the embodiments of this application more clearly, and do not constitute any limitation on the technical solutions provided in the embodiments of this application. A person of ordinary skill in the art may know that with evolution of the network architecture and emergence of a new service scenario, the technical solutions provided in the embodiments of this application are also applicable to a similar technical problem.

With reference to the foregoing descriptions, FIG. 1 is a schematic flowchart of a reference signal transmission method according to an embodiment of this application. Refer to FIG. 1. The method includes the following steps.

Step 101: Determine an initial seed parameter of a pseudo-random sequence, and generate the pseudo-random sequence based on the initial seed parameter.

The initial seed parameter is determined based on attribute information of a terminal device. Further, the initial seed parameter may be an integer determined based on the attribute information of the terminal device.

Step 102: Determine a cyclic shift value based on the pseudo-random sequence, and determine a reference signal based on the cyclic shift value.

Step 103: Send the reference signal to a network device.

The reference signal may be an uplink sounding reference signal (sounding reference signal, SRS), an uplink demodulation reference signal (demodulation reference signal, DMRS), a phase tracking signal, or the like.

Step 101 to step 103 may be performed by the terminal device.

Step 104: Determine an initial seed parameter of a pseudo-random sequence, and generate the pseudo-random sequence based on the initial seed parameter.

Step 105: Determine a cyclic shift value based on the pseudo-random sequence, and determine a reference signal based on the cyclic shift value.

Step 106: Detect a signal from a terminal device by using the reference signal.

Step 104 to step 106 may be performed by a network device.

In the foregoing method procedure, the initial seed parameter of the pseudo-random sequence used for determining the cyclic shift value is determined based on the attribute information of the terminal device. The attribute information of the terminal device is information specific to the terminal device, and therefore, pseudo-random sequences used by different terminal devices to determine cyclic shift values are different. In this method, a difference between cyclic shift values used by any two terminal devices in a cell to determine reference signals can be randomized. Further, interference between reference signals sent by the terminal devices can be reduced, the interference is randomized, and channel time domain filtering performance is improved.

It may be understood that, in the foregoing method procedure, step 101 to step 103 and step 104 to step 106 may be separately implemented. In other words, from a perspective of the terminal device, in the foregoing method procedure, only step 101 to step 103 may be performed, and from a perspective of the network device, in the foregoing method procedure, only step 104 to step 106 may be performed.

In the procedure shown in FIG. 1, there may be a plurality of specific implementations of the pseudo-random sequence. For example, refer to an implementation of a pseudo-random sequence that is in an existing standard and that is used to generate a cyclic shift value. For example, the pseudo-random sequence $c(\cdot)$ may meet the following forms:

$$c(n) = (x_1(n+N_C) + x_2(n+N_C)) \bmod 2 \qquad (1)$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

$N_c=1600$; $x_1(0)=1$, $x_1(n)=0$, $n=1, 2, \ldots, 30$; $x_2(n)$, $n=0, 1, 2, \ldots, 30$ is a binary expression manner of the initial seed parameter $c_{init}$ of the pseudo-random sequence $c(\cdot)$, in other words, $c_{init}=\Sigma_{i=0}^{30} x_2(i) \cdot 2^i$, where $i=0, 1, 2, \ldots, 30$; and mod is a modulo operation.

The initial seed parameter $c_{init}$ of the pseudo-random sequence $c(\cdot)$ in formula (1) is actually a cell identity of a cell in which the terminal device is located. When the initial seed parameter $c_{init}$ is the cell identity of the cell in which the terminal device is located, interference between reference signals finally determined by all terminal devices in the cell based on the initial seed parameter $c_{init}$ cannot be randomized, and consequently, channel time domain filtering performance deteriorates, and the interference between the reference signals is relatively large.

Therefore, in this embodiment of this application, the initial seed parameter of the pseudo-random sequence may be determined by using the attribute information of the terminal device. Descriptions are separately provided below.

The attribute information of the terminal device may be specifically a feature used to indicate that one terminal device is different from another terminal device, or a feature that is common to one group of terminal devices but that is different from that of another terminal device. The following several possible implementations are merely used as examples for description, and do not limit the attribute information of the terminal device in this application.

In a possible implementation, the attribute information of the terminal device includes a root indicator (Root indicator) q of a ZC sequence used for determining the reference signal. In this implementation, the root indicator q and the initial seed parameter $c_{init}$ may meet the following relationship: $c_{init}=f_1(q)$. Values of $f_1(q)$ obtained based on different root indicators q are different. Because root indicators of ZC sequences corresponding to different base sequences are different, values of $c_{init}$ of terminal devices that generate reference signals by using a same ZC sequence are the same, and values of $c_{init}$ of terminal devices that generate reference signals by using different ZC sequences are different.

It should be noted that a specific implementation of $c_{init}=f_1(q)$ is not limited in this embodiment of this application, and there may be a plurality of manners. For example, $c_{init}=q+K$, where K is a preset positive integer, for example, K=2. For another example, $c_{init}=q$. In other words, the initial seed parameter $c_{init}$ is equal to the root indicator q. Another case is not described.

In this implementation, because reference signals generated based on different cyclic shift of a same base sequence are orthogonal to each other, only interference between reference signals generated based on different base sequences needs to be considered. Because values of root indicators q of ZC sequences corresponding to different base sequences are different, cyclic shift hopping modes for reference signals generated based on different base sequences may be different, so that interference is randomized.

In a possible implementation, the attribute information of the terminal device includes a sequence identifier of the reference signal. In this implementation, the sequence identifier $n_{ID}^{SRS}$ and the initial seed parameter $c_{init}$ may meet the following relationship: $c_{init}=f_2(n_{ID}^{SRS})$. Values of $f_2(n_{ID}^{SRS})$ obtained based on different sequence identifiers $n_{ID}^{SRS}$ are different. Because sequence identifiers of different reference signals are different, values of $c_{init}$ of terminal devices that use a same reference signal are the same, and values of $c_{init}$ of terminal devices that use different reference signals are different.

It should be noted that a specific implementation of $c_{init}=f_2(n_{ID}^{SRS})$ is not limited in this embodiment of this application, and there may be a plurality of manners. For example, $c_{init}=n_{ID}^{SRS}+K$, where K is a preset positive integer, for example, K=2. For another example, $c_{init}=n_{ID}^{SRS}$. In other words, the initial seed parameter $c_{init}$ is equal to the sequence identifier $n_{ID}^{SRS}$. Another case is not described.

In this implementation, different reference signal sequence identifiers $n_{ID}^{SRS}$ may be configured for different terminal devices, so that cyclic shift hopping modes for reference signals sent by different terminal devices are different. In this way, interference is randomized.

In a possible implementation, the attribute information of the terminal device may include identification information of the terminal device. The identification information may be dedicated identification information of the terminal device. For example, the identification information may be a cell radio network temporary identity (cell radio network temporary identity, C-RNTI) of the terminal device, an international mobile subscriber identity (international mobile subscriber identity, IMSI) of the terminal device, or a temporary mobile station identifier (temporary mobile station identifier, TMSI) of the terminal device. The identification information may alternatively be identification information shared by a group of terminal devices. This is not limited in this application.

In this implementation, the identification information $n_{ID}^{UE}$ of the terminal device and the initial seed parameter $c_{init}$ may meet the following relationship: $c_{init}=f_3(n_{ID}^{UE})$. Values of $f_3(n_{ID}^{UE})$ obtained based on different identification information $n_{ID}^{UE}$ are different. Because different terminal devices have different identification information, values of $c_{init}$ of terminal devices that use different identification information are different.

Similarly, in this implementation, a specific implementation of $c_{init}=f_3(n_{ID}^{UE})$ is not limited, and details are not described herein.

In the procedure shown in FIG. 1, the cyclic shift value may be determined by using a plurality of methods. Descriptions are separately described below.

A first method is: The cyclic shift value α determined based on the pseudo-random sequence meets the following formula:

$$\alpha = \frac{2\pi}{Z}((\alpha_{init} + n_{cs}(n_{s,f}^{\mu}, l)) \bmod Z) \quad (2)$$

$n_{cs}(n_{s,f}^{\mu}, l) = \Sigma_{m=0}^{T-1} 2^m c(T \cdot N_{symb}^{slot} n_{s,f}^{\mu} + T \cdot l + m)$, where m=0, 1, 2, ..., T−1; $n_{s,f}^{\mu}$ is a slot number (slot number), in a current system frame, of a slot in which the reference signal is sent, and the slot number is related to a subcarrier spacing, for example, when the subcarrier spacing is 15 kHz, the slot number is an integer from 0 to 9; μ is a configured value of the subcarrier spacing, and corresponds one-to-one to a value of the subcarrier spacing; $N_{symb}^{slot}$ is a quantity of orthogonal frequency division multiplexing (orthogonal frequency division multiplexing, OFDM) symbols in one slot; l is a symbol number (symbol number), in a current slot, of a symbol in which the reference signal is sent, and $0 \leq l \leq N_{symb}^{slot}-1$, where l=0 corresponds to a first symbol in the current slot, for example, if the reference signal is sent in an eleventh symbol in the current slot, l=10; Z is a positive integer; $\alpha_{init}$ is a predefined initial cyclic shift value or an initial cyclic shift value configured by the network device; T is a preset positive integer or a positive integer determined based on a predefined rule and/or configuration information of the network device, for example, T=8; and c(•) is the pseudo-random sequence.

Further, Z is a fixed positive integer in a protocol, or Z is a positive integer determined based on the predefined rule and/or the configuration information of the network device. Specifically, Z may be $n_{RS}^{cs, max}$, and $n_{RS}^{cs, max}$ is a maximum cyclic shift value, namely, a maximum value of a cyclic shift value specified in a standard. In the embodiments of this application, if no special description is provided, a meaning of Z is the same as that described herein, and details are not described again.

In the foregoing method, cyclic shift values of reference signals sent by terminal devices in a same system frame can be randomized, so that interference, in the same system frame, between any two terminal devices that determine reference signals by using different ZC sequences can be randomized. In this way, time domain filtering performance for the reference signal is improved, and channel estimation accuracy is improved.

A second method is: The cyclic shift value α determined based on the pseudo-random sequence meets the following formula:

$$\alpha = \frac{2\pi}{Z}((\alpha_{init} + n_{cs}(n_{SRS})) \bmod Z) \quad (3)$$

$n_{cs}(n_{SRS}) = \Sigma_{m=0}^{T-1} 2^m c(T n_{SRS} + m)$, where m=0, 1, 2, ..., T−1; $n_{SRS}$ is a counting value of a reference signal counter; Z is a preset positive integer or a positive integer determined based on a predefined rule and/or configuration information of the network device, and for content of Z, refer to descriptions in formula (2), and details are not described herein again; $\alpha_{init}$ is a predefined initial cyclic shift value or an initial cyclic shift value configured by the network device; T is a preset positive integer or a positive integer determined based on the predefined rule and/or the configuration information of the network device, for example, T=8; and c(•) is the pseudo-random sequence.

For example, when the reference signal is an SRS, $n_{SRS}$ in formula (3) may meet the following formula:

$$n_{SRS} = \left(\frac{N_{slot}^{frame,\mu} n_f + n_{s,f}^{\mu} - T_{offset}}{T_{SRS}}\right) \cdot \left(\frac{N_{symb}^{SRS}}{R}\right) + \left\lfloor\frac{l'}{R}\right\rfloor \quad (4)$$

In formula (4), $N_{slot}^{frame,\mu}$ is a quantity of slots in each system frame, and the quantity of slots in each system frame is related to a subcarrier spacing; µ is a configured value of the subcarrier spacing, and corresponds one-to-one to a value of the subcarrier spacing, and the subcarrier spacing may also be referred to as a subcarrier width; $n_f$ is a system frame number; $n_{s,f}^{\mu}$ is a slot number, in a current system frame, of a slot in which the reference signal is sent, and the slot number is related to the subcarrier spacing; l'∈ {0, 1, ..., $N_{symb}^{SRS}$−1} is a symbol number, in a reference signal resource, of a symbol in which the reference signal is sent; $N_{symb}^{SRS}$ is a predefined quantity of consecutive OFDM symbols or a quantity of consecutive OFDM symbols that are configured by the network device and that can be used to send the reference signal; $T_{SRS}$ is a reference signal sending cycle, T is a slot offset value of the reference value, and $T_{SRS}$ and $T_{offset}$ are determined based on a predefined rule and/or configuration information of the network device; and R is a reference signal repetition factor (repetition factor), and is determined based on the predefined rule and/or the configuration information of the network device.

In the foregoing method, cyclic shift values of reference signals sent by the terminal device on a same frequency domain resource for two or more consecutive times can be randomized, so that interference between reference signals sent twice or a plurality of times on a same time-frequency resource by any two terminal devices that determine the reference signals by using different ZC sequences can be randomized. In this way, time domain filtering performance for the reference signal is improved, and channel estimation accuracy is improved.

A third method is: The cyclic shift value α determined based on the pseudo-random sequence meets the following formula:

$$\alpha = \frac{2\pi}{Z}\left((\alpha_{init} + n_{cs}(N_{slot}^{frame,\mu}, n_f, n_{s,f}^{\mu}, L, T_{SRS})) \bmod Z\right) \quad (5)$$

$$n_{cs}(N_{slot}^{frame,\mu}, n_f, n_{s,f}^{\mu}, L, T_{SRS}) = \sum_{m=0}^{T-1} 2^m c\left(T\left\lfloor\frac{N_{slot}^{frame,\mu} n_f + n_{s,f}^{\mu} - L}{T_{SRS}}\right\rfloor + m\right),$$

where m=0, 1, 2, ..., T−1; $n_{s,f}^{\mu}$ is a slot number, in a current system frame, of a slot in which the reference signal is sent, and the slot number is related to a subcarrier spacing; µ is a configured value of the subcarrier spacing, and corresponds one-to-one to a value of the subcarrier spacing; $n_f$ is a system frame number; $N_{slot}^{frame,\mu}$ is a quantity of slots in each system frame, and the quantity of slots is related to the subcarrier spacing; $T_{SRS}$ is a reference signal sending cycle; L is a preset integer or a non-negative integer determined in a predetermined manner and/or based on configuration information of the network device, for example, L may be a slot offset value $T_{offset}$ of the reference signal; Z is a preset positive integer or a positive integer determined based on a predefined rule and/or the configuration information of the network device, and for content of Z, refer to descriptions in formula (2), and details are not described herein again; $\alpha_{init}$ is a predefined initial cyclic shift value or an initial cyclic shift value configured by the network device; T is a preset positive integer or a positive integer determined based on the predefined rule and/or the configuration information of the network device; S is a positive integer, for example, S is a quantity of OFDM symbols in one slot, in other words, S=$N_{symb}^{slot}$; and c(•) is the pseudo-random sequence.

In the foregoing method, cyclic shift values of reference signals sent by the terminal device in any two reference signal sending cycles can be randomized, so that interference between reference signals of any two terminal devices that determine the reference signals by using different ZC sequences can be randomized. In this way, time domain filtering performance for the reference signal is improved, and channel estimation accuracy is improved.

A fourth method is: The cyclic shift value α determined based on the pseudo-random sequence meets the following formula:

$$\alpha = \frac{2\pi}{Z}\left((\alpha_{init} + n_{cs}(N_{slot}^{frame,\mu}, n_f, n_{s,f}^{\mu}, l)) \bmod Z\right) \quad (6)$$

$n_{cs}(N_{slot}^{frame,\mu}, n_f, n_{s,f}^{\mu}, l) = \sum_{m=0}^{T-1} 2^m c(TS(N_{slot}^{frame,\mu} n_f + n_{s,f}^{\mu}) + Tl + m)$, where m=0, 1, 2, ..., T−1; $n_{s,f}^{\mu}$ is a slot number, in a current system frame, of a slot in which the reference signal is sent, and the slot number is related to a subcarrier spacing; µ is a configured value of the subcarrier spacing, and corresponds one-to-one to a value of the subcarrier spacing; $n_f$ is a system frame number; $N_{slot}^{frame,\mu}$ is a quantity of slots in each system frame, and the quantity of slots is related to the subcarrier spacing; l is a symbol number, in a current slot, of a symbol in which the reference signal is sent, and 0≤l≤$N_{symb}^{slot}$−1, where l=0 corresponds to a first symbol in the current slot; Z is a preset positive integer or a positive integer determined based on a predefined rule and/or configuration information of the network device, and for content of Z, refer to descriptions in formula (2), and details are not described herein again; $\alpha_{init}$ is a predefined initial cyclic shift value or an initial cyclic shift value configured by the network device; T is a preset positive integer or a positive integer determined based on the predefined rule and/or the configuration information of the network device; and c(•) is the pseudo-random sequence.

In the foregoing method, cyclic shift values of reference signals sent by the terminal device in any two or more symbols can be randomized, so that interference between reference signals sent in any two or more symbols by any two terminal devices that determine the reference signals by using different ZC sequences can be randomized. In this way, time domain filtering performance for the reference signal is improved, and channel estimation accuracy is improved.

Further, in the procedure shown in FIG. 1, how to determine the reference signal based on the cyclic shift value is not limited in this embodiment of this application. For example, when the reference signal is an SRS, an SRS s(m) whose length is M is generated based on a base sequence r(m) by using the following formula:

$$s(m) = A \exp(j\alpha m)r(m), m = 0, 1, 2, \ldots, M-1 \quad (7)$$

M is an integer greater than 1, $\alpha$ is the cyclic shift value, and j is an imaginary unit. A is a preset complex number. The base sequence may be a sequence generated based on a ZC sequence, for example, is the ZC sequence or a sequence generated by performing cyclic shift on the ZC sequence.

In the foregoing embodiment, the cyclic shift value is determined based on the pseudo-random sequence. In this embodiment of this application, the cyclic shift value may alternatively be determined in another manner. This is described in detail below.

Figure 2:
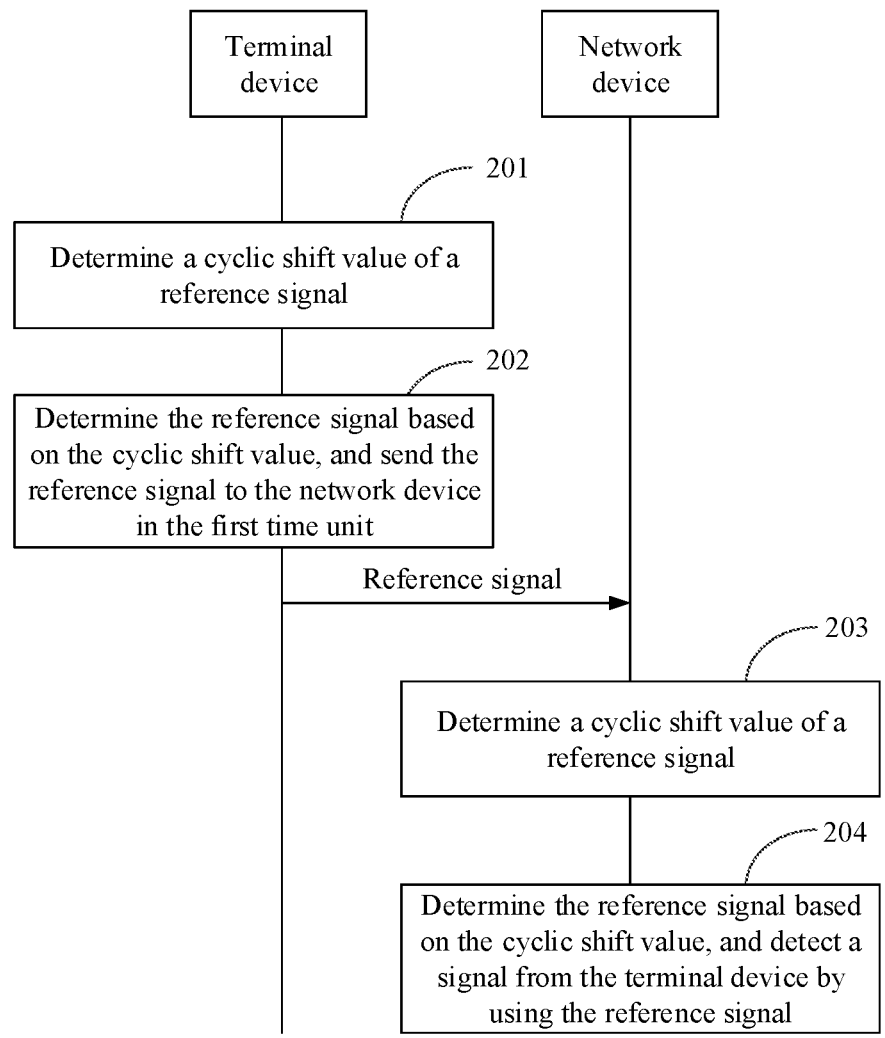
FIG. 2 is a schematic flowchart of a reference signal transmission method according to an embodiment of this application.

FIG. 2 is a schematic flowchart of a reference signal transmission method according to an embodiment of this application. Refer to FIG. 2. The method includes the following steps.

Step 201: Determine a cyclic shift value of a reference signal.

The cyclic shift value is determined based on a first cyclic shift interval, the first cyclic shift interval is determined from a first pattern based on information about a first time unit, the first pattern includes Y cyclic shift intervals, Y is an integer greater than 1, the first pattern is determined from X patterns, and X is a positive integer; or the cyclic shift value is determined based on a first cyclic shift step and the information about the first time unit, the first cyclic shift step is determined from Z cyclic shift steps, and Z is a positive integer; or the cyclic shift value is determined based on a first initial cyclic shift step, a first cyclic shift step gap, and the information about the first time unit, the first initial cyclic shift step is determined from Z initial cyclic shift steps, the first cyclic shift step gap is determined from Z cyclic shift step gaps, and Z is a positive integer. The information about the first time unit includes a number of a system frame in which the first time unit is located, a slot number, in a current system frame, of a slot in which the first time unit is located, and/or a symbol number, in a current slot, of a symbol in which the first time unit is located, and the first time unit is a time unit for sending the reference signal.

For example, the first pattern may be determined from the X patterns according to first indication information; the first cyclic shift step may be determined from the Z cyclic shift steps according to second indication information; the first initial cyclic shift step may be determined from the Z initial cyclic shift steps according to third indication information; and the first cyclic shift step gap may be determined from the Z cyclic shift step gaps according to fourth indication information. The first indication information to the fourth indication information may be sent by a network device to a terminal device.

In this embodiment of this application, the first time unit may be a slot, an OFDM symbol, or a time unit such as a subframe or a system frame. It should be noted that, that the information about the first time unit includes a number of a system frame in which the first time unit is located, a slot number, in a current system frame, of a slot in which the first time unit is located, and/or a symbol number, in a current slot, of a symbol in which the first time unit is located may include the following cases:

Case 1: The first time unit is a subframe, and the information about the first time unit includes the number of the system frame in which the first time unit is located.

Case 2: The first time unit is a slot, and the information about the first time unit includes the number of the system frame in which the first time unit is located and/or a slot number of the first time unit (namely, a slot) in the current system frame.

Case 3: The first time unit is an OFDM symbol, and the information about the first time unit includes the number of the system frame in which the first time unit is located, the slot number, in the current system frame, of the slot in which the first time unit is located, and/or a symbol number of the first time unit (namely, a symbol) in the current slot.

It should be noted that in this embodiment of this application, when the first time unit is an OFDM symbol, a case 4 may further exist.

Case 4: The first time unit is an OFDM symbol, and the information about the first time unit includes the number of the system frame in which the first time unit is located, the number, in the current system frame, of the slot in which the first time unit is located, a symbol number of the first time unit (namely, a symbol) in the current slot, and/or a symbol number of the first time unit (namely, a symbol) in a current reference signal resource.

The case 3 may be applicable to formula (8), formula (10), and formula (12) that are described below. The case 4 may be applicable to formula (9), formula (11), and formula (13) that are described below.

Certainly, the foregoing is merely an example, and there may be another case. Details are not described herein.

Step 202: Determine the reference signal based on the cyclic shift value, and send the reference signal to the network device in the first time unit.

The reference signal may be an SRS, a DMRS, or the like.

Step 201 and step 202 may be performed by the terminal device.

Step 203: Determine a cyclic shift value of a reference signal.

A method for determining the cyclic shift value in step 203 may be the same as that in step 201, and details are not described herein again.

Step 204: Determine the reference signal based on the cyclic shift value, and detect a signal from the terminal device by using the reference signal.

Step 203 and step 204 may be performed by the network device.

It may be understood that, in the foregoing method procedure, step 201 and step 202 and step 203 and step 204 may be separately implemented. In other words, from a perspective of the terminal device, in the foregoing method procedure, only step 201 and step 202 may be performed, and from a perspective of the network device, in the foregoing method procedure, only step 203 and step 204 may be performed.

In the procedure shown in FIG. 2, how to determine the reference signal based on the cyclic shift value is not limited in this embodiment of this application. For example, refer to the method in the procedure shown in FIG. 1. Details are not described herein again.

In the procedure shown in FIG. 2, the cyclic shift value may be determined by using a plurality of methods. Descriptions are separately described below.

Method 1: The cyclic shift value is determined based on a first cyclic shift step and information about the first time unit, the first time unit is an OFDM symbol, the information about the first time unit includes a number of a system frame in which the first time unit is located and a slot number, in a current system frame, of a slot in which the first time unit is located, and the cyclic shift value $\alpha$ is determined based on $\lambda$, for example, $\alpha=\lambda$, and $\lambda$ meets the following formula:

$$\lambda = \frac{2\pi}{Z}\left(\left(\alpha_{init} + \Delta\text{hopping} \times \left\lfloor \frac{N_{slot}^{frame,\mu} n_f + n_{s,f}^{\mu} - L}{T_{SRS}} \right\rfloor\right) \bmod Z\right) \quad (8)$$

Alternatively, the cyclic shift value is determined based on a first cyclic shift step and information about the first time unit, the first time unit is an OFDM symbol, the information about the first time unit includes a number of a system frame in which the first time unit is located, a number, in a current system frame, of a slot in which the first time unit for sending the reference signal is located, and a symbol number of the first time unit in a reference signal resource, the symbol number belongs to a set $\{0, 1, \ldots, N_{symb}^{SRS}-1\}$, $N_{symb}^{SRS}$ is a predefined quantity of consecutive OFDM symbols or a quantity of consecutive OFDM symbols that are configured by the network device and that can be used to send the reference signal, and the cyclic shift value α is determined based on λ, for example, α=λ, and λ meets the following formula:

$$\lambda = \frac{2\pi}{Z}\left(\left(\alpha_{init} + \Delta\text{hopping} \times \left(\left\lfloor \frac{N_{slot}^{frame,\mu} n_f + n_{s,f}^{\mu} - L}{T_{SRS}} \right\rfloor + B\right) R + (l' \bmod R)\right) \bmod Z\right) \quad (9)$$

Δhopping is the first cyclic shift step; $N_{slot}^{frame,\mu}$ is a quantity of slots in each system frame, and the quantity of slots is related to a subcarrier spacing; μ is a configured value of the subcarrier spacing, and corresponds one-to-one to a value of the subcarrier spacing; $n_f$ is a system frame number; $n_{s,f}^{\mu}$ is a slot number, in a current system frame, of a slot in which the reference signal is sent, and the slot number is related to the subcarrier spacing; L is a preset integer or a non-negative integer determined in a predetermined manner and/or based on configuration information of the network device, for example, L may be a slot offset value $T_{offset}$ of the reference signal; $T_{SRS}$ is a reference signal sending cycle; Z is a preset positive integer or a positive integer determined based on a predefined rule and/or the configuration information of the network device, and for content of Z, refer to descriptions in formula (2), and details are not described herein again; $\alpha_{init}$ is a predefined initial cyclic shift value or an initial cyclic shift value configured by the network device; R is a reference signal repetition factor (repetition factor); $l' \in \{0, 1, \ldots, N_{symb}^{SRS}-1\}$ is a symbol number, in the reference signal resource, of a symbol in which the reference signal is sent; $N_{symb}^{SRS}$ is a predefined quantity of consecutive OFDM symbols or a quantity of consecutive OFDM symbols that are configured by the network device and that can be used to send the reference signal; and B is a preset integer or an integer determined based on the predefined rule and/or the configuration information of the network device.

In formula (8), $n_f$ and $n_{s,f}^{\mu}$ are the information about the first time unit. In formula (9), $n_f$, $n_{s,f}^{\mu}$, and l' are the information about the first time unit.

For example, the first cyclic shift step Δhopping may be a value in a preset set. For example, the preset set is $\{0, 1, 2, \ldots, Z-1\}$.

For example, the network device may send second indication information to the terminal device, and the second indication information is used to indicate the first cyclic shift step. Therefore, the terminal device may determine the first cyclic shift step according to the second indication information. For example, the network device preconfigures Z cyclic shift steps for the terminal device, and the second indication information is used to indicate a cyclic shift step in the Z cyclic shift steps. For example, the second indication information may be an index value of the first cyclic shift step in the Z cyclic shift steps. The terminal device may determine the first cyclic shift step according to the second indication information.

In the foregoing method, terminal devices that send reference signals on a same time-frequency resource may be classified into G groups based on base sequences for generating the reference signals, where G is a quantity of base sequences. Terminal devices belonging to a same group generate reference signals by using a same base sequence, and terminal devices belonging to different groups generate reference signals by using different base sequences. When G is less than or equal to Z, the network device may configure different values of Δhopping for the G groups of terminal devices. In other words, a same value of Δhopping is configured for terminal devices that determine reference signals by using a same base sequence, and different values of Δhopping are configured for terminal devices that determine reference signals by using different base sequences. In this manner, differences between cyclic shift of reference signals sent on any two same adjacent frequency domain resources by any two terminal devices that are in the G groups of terminal devices and that belong to different groups may be different, so that interference between reference signals of any two terminal devices that generate reference signal sequences based on different base sequences can be randomized, and channel measurement accuracy can be improved.

Method 2: The cyclic shift value is determined based on a first cyclic shift interval, the first time unit is an OFDM symbol, the first cyclic shift interval is determined from a first pattern based on information about the first time unit, the information about the first time unit includes a number of a system frame in which the first time unit is located and a slot number, in a current system frame, of a slot in which the first time unit is located, and the cyclic shift value α is determined based on λ, for example, α=λ, and λ may meet the following formula:

$$\lambda = \frac{2\pi}{Z}\left(\left(\alpha_{init} + \beta \left\lfloor \frac{N_{slot}^{frame,\mu} n_f + n_{s,f}^{\mu} - L}{T_{SRS}} \right\rfloor_{\bmod Y}\right) \bmod Z\right) \quad (10)$$

Alternatively, the cyclic shift value is determined based on a first cyclic shift interval, the first time unit is an OFDM symbol, the first cyclic shift interval is determined from a first pattern based on information about the first time unit, the information about the first time unit includes a number of a system frame in which the first time unit is located, a slot number, in a current system frame, of a slot in which the first time unit is located, and a symbol number of the first time unit in a reference signal resource, the symbol number belongs to a set $\{0, 1, \ldots, N_{symb}^{SRS}-1\}$, $N_{symb}^{SRS}$ is a predefined quantity of consecutive OFDM symbols or a quantity of consecutive OFDM symbols that are configured by the network device and that can be used to send the reference signal, and the cyclic shift value α is determined based on λ, for example, α=λ, and λ may meet the following formula:

$$\lambda = \frac{2\pi}{Z}\left(\left(\alpha_{init} + \beta \left\lfloor \frac{N_{slot}^{frame,\mu} n_f + n_{s,f}^{\mu} - L}{T_{SRS}} \right\rfloor + B\right) R + (l' \bmod R)\right) \bmod Y\right) \bmod Z\right) \quad (11)$$

$N_{slot}^{frame,\mu}$ is a quantity of slots in each system frame, and the quantity of slots is related to a subcarrier spacing; $\mu$ is a configured value of the subcarrier spacing, and corresponds one-to-one to a value of the subcarrier spacing; $n_f$ is a system frame number; $n_{s,f}^{\mu}$ is a slot number, in the current system frame, of a slot in which the reference signal is sent, and the slot number is related to the subcarrier spacing; L is a preset integer or a non-negative integer determined in a predetermined manner and/or based on configuration information of the network device, for example, L may be a slot offset value $T_{offset}$ of the reference signal; $T_{SRS}$ is a reference signal sending cycle; Z is a preset positive integer or a positive integer determined based on a predefined rule and/or the configuration information of the network device, and for content of Z, refer to descriptions in formula (2), and details are not described herein again; $\alpha_{init}$ is a predefined initial cyclic shift value or an initial cyclic shift value configured by the network device; R is a reference signal repetition factor (repetition factor); $l' \in \{0, 1, \ldots, N_{symb}^{SRS}-1\}$ is a symbol number, in the reference signal resource, of a symbol in which the reference signal is sent; $N_{symb}^{SRS}$ is a predefined quantity of consecutive OFDM symbols or a quantity of consecutive OFDM symbols that are configured by the network device and that can be used to send the reference signal; and B is a preset integer or an integer determined based on the predefined rule and/or the configuration information of the network device.

$$\beta \left\lfloor \frac{N_{slot}^{frame,\mu} n_f + n_{s,f}^{\mu} - L}{T_{SRS}} \right\rfloor \bmod Y \quad \text{or}$$

$$\beta \left(\left\lfloor \frac{N_{slot}^{frame,\mu} n_f + n_{s,f}^{\mu} - L}{T_{SRS}} \right\rfloor + B\right) R + (l' \bmod R)\right) \bmod Y$$

is the first cyclic shift interval, the first pattern is a set including Y cyclic shift intervals, the first pattern is $[\beta_0, \beta_1, \beta_2, \ldots, \beta_{Y-1}]$, Y is an integer greater than 1, and each cyclic shift interval included in the first pattern is an integer.

In formula (10), $n_f$ and $n_{s,f}^{\mu}$ are the information about the first time unit. In formula (11), $n_f$, $n_{s,f}^{\mu}$, and $l'$ are the information about the first time unit.

In this embodiment of this application, the Y cyclic shift intervals included in the first pattern may be predefined integers. In a possible implementation, X patterns may be predefined, X is a positive integer, and each of the X patterns includes Y cyclic shift intervals. The network device may send first indication information to the terminal device, where the first indication information is used to indicate one pattern in the X patterns, and the terminal device may determine the first pattern from the X patterns according to the first indication information.

How the X patterns are specifically implemented is not limited in this embodiment of this application. For example, Y cyclic shift intervals included in an $x^{th}$ pattern in the predefined X patterns are:

$$\left[\tilde{\beta}_0^{(\lfloor x/Z \rfloor)(x \bmod Z)}, \tilde{\beta}_1^{(\lfloor x/Z \rfloor)(x \bmod Z)}, \ldots, \tilde{\beta}_{Y-1}^{(\lfloor x/Z \rfloor)(x \bmod Z)}\right].$$

When the second indication information indicates that the first pattern is the $x^{th}$ pattern in the X patterns, a $y^{th}$ cyclic shift interval of the first pattern is $\beta_y = \tilde{\beta}_y^{(\lfloor x/Z \rfloor)(x \bmod Z)}$, $y=0, 1, \ldots, Y-1$.

The X patterns may be any X patterns that meet the following conditions:

Condition 1: For all non-negative integers i and j, $\tilde{\beta}_0^{(i)(j)}$ is any value in a set $\{0, 1, \ldots, Z-1\}$.

Condition 2: For $i \in \{0, 1, \ldots, \lfloor X/Z \rfloor\}$ and $y \in \{1, 2, \ldots, Y-1\}$, if $j_1 \neq j_2$, $b_y^{(i)(j_1)} \neq b_y^{(i)(j_2)}$ where $b_y^{(i)(j)} = (\tilde{\beta}_y^{(i)(j)} - \tilde{\beta}_{y-1}^{(i)(j)}) \bmod Z$.

Condition 3: For $i \in \{0, 1, \ldots, \lfloor X/Z \rfloor\}$, $j \in \{0, 1, \ldots, Z-1\}$, and $y \in \{1, 2, \ldots, Y-1\}$, $b_y^{(i)(j)} = b_y^{(i-1)((y-1+j) \bmod Z)}$.

Optionally, a value of $\tilde{\beta}_0^{(\lfloor x/Z \rfloor)(x \bmod Z)}$ and a value of $\{b_y^{(\lfloor x/Z \rfloor)(x \bmod Z)} | y \in \{1, \ldots, Y-1\}, x \in \{0, 1, \ldots, Z-1\}\}$ may be determined by the terminal device based on a predefined rule and/or the configuration information of the network device, where $\tilde{\beta}_0^{(\lfloor x/Z \rfloor)(x \bmod Z)}$ is any value in a set $\{0, 1, \ldots, Z-1\}$, and different x may correspond to a same value or different values of $\tilde{\beta}_0^{(\lfloor x/Z \rfloor)(x \bmod Z)}$. This is not limited in this embodiment of this application. For example, $\{\tilde{\beta}_0^{(\lfloor x/Z \rfloor)(x \bmod Z)} = 0 | \forall x \in \{0, 1, \ldots, X-1\}\}$.

A value of $\{b_y^{(\lfloor x/Z \rfloor)(x \bmod Z)} | y \in \{1, \ldots, Y-1\}, x \in \{0, 1, \ldots, Z-1\}\}$ is an integer that meets the condition 2 and that belongs to the set $\{0, 1, \ldots, Z-1\}$. For example, $\{b_y^{(\lfloor x/Z \rfloor)(x \bmod Z)} = x \bmod Z | \forall y \in \{1, \ldots, Y-1\}, x \in \{0, 1, \ldots, Z-1\}\}$. The terminal device may determine a value of $\{b_y^{(\lfloor x/Z \rfloor)(x \bmod Z)} | y \in \{1, \ldots, Y-1\}, x \in \{Z, Z+1, \ldots, X-1\}\}$ based on the value of $\{b_y^{(\lfloor x/Z \rfloor)(x \bmod Z)} | y \in \{1, \ldots, Y-1\}, x \in \{0, 1, \ldots, Z-1\}\}$ and the condition 3.

Further, the terminal device may determine a value of $\{\tilde{\beta}_y^{(\lfloor x/Z \rfloor)(x \bmod Z)} | x \in \{0, 1, \ldots, X-1\}, y \in \{0, 1, \ldots, Y-1\}\}$ based on a value of $\{\tilde{\beta}_0^{(\lfloor x/Z \rfloor)(x \bmod Z)} | x \in \{0, 1, \ldots, X-1\}\}$ and the value of $\{b_y^{(\lfloor x/Z \rfloor)(x \bmod Z)} | y \in \{1, \ldots, Y-1\}, x \in \{Z, Z+1, \ldots, X-1\}\}$. Specifically, the value of $\tilde{\beta}_y^{(\lfloor x/Z \rfloor)(x \bmod Z)}$ meets the following formula: $\tilde{\beta}_y^{(\lfloor x/Z \rfloor)(x \bmod Z)} = (\tilde{\beta}_0^{(\lfloor x/Z \rfloor)(x \bmod Z)} + \sum_{i=1}^{y} b_i^{(\lfloor x/Z \rfloor)(x \bmod Z)}) \bmod Z$.

For example, the X patterns may be: $\{\tilde{\beta}_y^{(\lfloor x/Z \rfloor)(x \bmod Z)} = (D + \sum_{i=1}^{y}((i-1)\lfloor x/Z \rfloor + x)) \bmod Z | y \in \{0, 1, \ldots, Y-1\}, x \in \{0, 1, \ldots, X-1\}\}$, where D may be any integer, for example, D=0.

In the foregoing method, terminal devices that send reference signals on a same time-frequency resource may be classified into G groups based on base sequences for generating the reference signals, where G is a quantity of base sequences. Terminal devices belonging to a same group generate reference signals by using a same base sequence, and terminal devices belonging to different groups generate reference signals by using different base sequences. The network device may configure different cyclic shift hopping patterns, namely, different values of x, for the G groups of terminal devices. In other words, a same cyclic shift hopping pattern, namely, a same value of x, is configured for terminal devices that determine reference signals by using a same base sequence, and different cyclic shift patterns, namely, different values of x, are configured for terminal devices that determine reference signals by using different base sequences. When G is less than or equal to Z, differences between cyclic shift of reference signals sent on any two same adjacent frequency domain resources by any two terminal devices that are in the G groups of terminal devices and that belong to different groups are different. In other words, interference between reference signals of any two terminal devices that generate reference signal sequences based on different base sequences can be randomized, so that channel measurement accuracy can be improved. When G is greater than Z and less than $Z^2$, differences between cyclic shift of reference signals sent on any three same adjacent frequency domain resources by any two terminal devices that are in the G groups of terminal devices and that belong to different groups are not entirely the same. In other words, when coherent bandwidth is greater than or equal to two times the reference signal sending cycle, channel measurement accuracy can be improved through time domain filtering.

Method 3: The cyclic shift value is determined based on a first initial cyclic shift step, a first cyclic shift step gap, and information about the first time unit, the first time unit is an OFDM symbol, the information about the first time unit includes a number of a system frame in which the first time unit is located and a slot number, in a current system frame, of a slot in which the first time unit is located, and the cyclic shift value α is determined based on λ, for example, α=λ, and λ meets the following formula:

$$\lambda = \frac{2\pi}{Z}\left(\left(\alpha_{init} + \Delta h_{init} \times N_{T_{SRS}} + \Delta h_{gap} \times \frac{N_{T_{SRS}} \times (N_{T_{SRS}} - 1)}{2}\right) \bmod Z\right) \quad (12)$$

$$N_{T_{SRS}} = \left\lfloor \frac{N_{slot}^{frame,\mu} n_f + n_{s,f}^{\mu} - L}{T_{SRS}} \right\rfloor$$

Alternatively, the cyclic shift value is determined based on a first initial cyclic shift step, a first cyclic shift step value, and information about the first time unit, the first time unit is an OFDM symbol, the information about the first time unit includes a number of a system frame in which the first time unit is located, a slot number, in a current system frame, of a slot in which the first time unit is located, and a symbol number of the first time unit in a reference signal resource, the symbol number belongs to a set $\{0, 1, \ldots, N_{symb}^{SRS}-1\}$, $N_{symb}^{SRS}$ is a predefined quantity of consecutive OFDM symbols or a quantity of consecutive OFDM symbols that are configured by the network device and that can be used to send the reference signal, and the cyclic shift value α is determined based on λ, for example, α=λ, and λ meets the following formula:

$$\chi = \frac{2\pi}{Z}\left(\left(\alpha_{init} + \Delta h_{init} \times N_{T_{SRS}} + \Delta h_{gap} \times \frac{N_{T_{SRS}} \times (N_{T_{SRS}} - 1)}{2}\right) \bmod Z\right) \quad (13)$$

$$N_{T_{SRS}} = \left(\left\lfloor \frac{N_{slot}^{frame,\mu} n_f + n_{s,f}^{\mu} - L}{T_{SRS}} \right\rfloor + B\right) R + (l' \bmod R)$$

$N_{slot}^{frame,\mu}$ is a quantity of slots in each system frame, and the quantity of slots is related to a subcarrier spacing; μ is a configured value of the subcarrier spacing, and corresponds one-to-one to a value of the subcarrier spacing; $n_f$ is a system frame number; $n_{s,f}^{\mu}$ is a slot number, in the current system frame, of a slot in which the reference signal is sent, and the slot number is related to the subcarrier spacing; L is a preset integer or an integer determined in a predetermined manner and/or based on configuration information of the network device, for example, L may be a slot offset value $T_{offset}$ of the reference signal; $T_{SRS}$ is a reference signal sending cycle; Z is a preset positive integer or a positive integer determined based on a predefined rule and/or the configuration information of the network device, and for content of Z, refer to descriptions in formula (2), and details are not described herein again; $\Delta h_{init}$ is the first initial cyclic shift step; $\Delta h_{gap}$ is the first cyclic shift step gap; $\alpha_{init}$ is a predefined initial cyclic shift value or an initial cyclic shift value configured by the network device; R is a reference signal repetition factor (repetition factor); $l' \in \{0, 1, \ldots, N_{symb}^{SRS}-1\}$ is a symbol number, in the reference signal resource, of a symbol in which the reference signal is sent; $N_{symb}^{SRS}$ is a predefined quantity of consecutive OFDM symbols or a quantity of consecutive OFDM symbols that are configured by the network device and that can be used to send the reference signal; and B is a preset integer or an integer determined based on the predefined rule and/or the configuration information of the network device.

For example, the first initial cyclic shift step $\Delta h_{init}$ may be a value in a first preset set. For example, the first preset set is $\{0, 1, 2, \ldots, Z-1\}$. The first cyclic shift step gap $\Delta h_{gap}$ may be a value in a second preset set. For example, the second preset set is $\{0, 1, 2, \ldots, Z-1\}$.

In formula (12), $n_f$ and $n_{s,f}^{\mu}$ are the information about the first time unit. In formula (13), $n_f$, $n_{s,f}^{\mu}$, and l' are the information about the first time unit.

In a possible implementation, the network device sends third indication information to the terminal device, and indicates the first initial cyclic shift step to the terminal device by using the third indication information. For example, the network device preconfigures Z initial cyclic shift steps, and the third indication information is used to indicate one initial cyclic shift step in the Z initial cyclic shift steps. Therefore, the terminal device may determine the first initial cyclic shift step from the Z initial cyclic shift steps according to the third indication information.

Correspondingly, the network device may further send fourth indication information to the terminal device, and indicate the first cyclic shift step gap to the terminal device by using the fourth indication information. For example, the network device preconfigures Z first cyclic shift step gaps, and the fourth indication information is used to indicate one cyclic shift step gap in the Z first cyclic shift step gaps. Therefore, the terminal device may determine the first cyclic shift step gap from the Z first cyclic shift step gaps according to the fourth indication information.

In the foregoing method, terminal devices that send reference signals on a same time-frequency resource may be classified into G groups based on base sequences for generating the reference signals, where G is a quantity of base sequences. Terminal devices belonging to a same group generate reference signals by using a same base sequence, and terminal devices belonging to different groups generate reference signals by using different base sequences. The network device may configure different initial cyclic shift steps and/or different cyclic shift step gaps for the G groups of terminal devices. In other words, a same initial cyclic shift step and a same cyclic shift step gap are configured for terminal devices that determine reference signals by using a same base sequence, and different initial cyclic shift steps and/or different cyclic shift step gaps are configured for terminal devices that determine reference signals by using different base sequences. When G is less than or equal to Z, differences between cyclic shift of reference signals sent on any two same adjacent frequency domain resources by any two terminal devices that are in the G groups of terminal devices and that belong to different groups are different. In other words, interference between reference signals of any two terminal devices that generate reference signal sequences based on different base sequences can be randomized, so that channel measurement accuracy can be improved. When G is greater than Z and less than $z^2$, differences between cyclic shift of reference signals sent on any three same adjacent frequency domain resources by any two terminal devices that are in the G groups of terminal devices and that belong to different groups are not entirely the same. In other words, when coherent bandwidth is greater than or equal to two times the reference signal sending cycle, channel measurement accuracy can be improved through time domain filtering.

In the foregoing described embodiment, before the reference signal is generated, the cyclic shift value needs to be determined first. An embodiment of this application further provides a method. The cyclic shift value is determined based on a predefined rule and/or configuration information of the network device. In this case, orthogonal cover code is added to reference signals, so that interference between the reference signals is randomized. Detailed descriptions are provided below.

Step 1: The terminal device generates a reference signal.
Step 2: The terminal device sends the reference signal.
Step 3: The network device generates a reference signal.
Step 4: The network device detects a signal from the terminal device by using the reference signal.

The reference signal generated by the terminal device or the network device may meet the following formula:

$$s(m) = A \exp(j\alpha m)r(m) \times B_{x,y}, m = 0, 1, 2, \ldots, M-1 \quad (14)$$

r(m) is a base sequence used for generating the reference signal; M is an integer greater than 1, and is a length of the reference signal; C is the cyclic shift value, and the cyclic shift value is predefined or configured by the network device; j is an imaginary unit; A is a preset complex number; and $B_{x,y}$ is orthogonal cover code (orthogonal cover code), and may meet the following formula:

$$B_{x,y} = C_{Z_{root},y}(x), x = \left\lfloor \frac{N_{slot}^{frame,\mu} n_f + n_{s,f}^{\mu} - L}{T_{SRS}} \right\rfloor \bmod Z_{root} \quad (15)$$

$C_{Z_{root},y}(\bullet)$ is an orthogonal variable spreading factor (Orthogonal Variable Spreading Factor, OVSF) sequence; L is determined by using a predefined rule or determined based on configuration information of the network device, for example, L is a slot offset $T_{offset}$ of the reference signal; x is an integer greater than or equal to 0 and less than $Z_{root}$, where x=0 corresponds to a first value in the sequence $C_{Z_{root},y}(\bullet)$; y is an integer greater than or equal to 0 and less than $Z_{root}$, and is determined based on the predefined rule and/or based on the configuration information of the network device, and optionally, the network device may configure a same value of y for terminal devices that determine reference signals by using a same base sequence; and $Z_{root}$ is a positive integer and is determined based on the predefined rule and/or the configuration information of the network device.

Optionally, the orthogonal variable spreading factor sequence $C_{Z_{root},y}(\bullet)$ meets the following formula:

$$C_{1,0} = [1], C_{a,y} = \left[ C_{\lceil a/2 \rceil, \lfloor y/2 \rfloor}, C_{\lceil a/2 \rceil, \lfloor y/2 \rfloor} \times (-1)^{y \bmod 2} \right] \quad (16)$$

In the foregoing method, terminal devices that send reference signals on a same time-frequency resource may be classified into G groups based on base sequences for generating the reference signals, where G is a quantity of base sequences. Terminal devices belonging to a same group generate reference signals by using a same base sequence, and terminal devices belonging to different groups generate reference signals by using different base sequences. When G is less than or equal to $Z_{root}$, the network device may allocate different values of y for terminal devices that belong to different groups, and then, time domain filtering is performed on $Z_{root}$ consecutive reference signal sending cycles, to eliminate interference exerted on a reference signal sent by any one of the G terminal devices by a reference signal sent by another terminal device in the G terminal devices. In other words, when coherent time is greater than or equal to $Z_{root}$ times the reference signal sending cycle, channel measurement accuracy can be improved through time domain filtering.

The embodiments described in this specification may be independent solutions, or may be combined based on internal logic. These solutions all fall within the protection scope of this application.

It may be understood that, in the foregoing method embodiments, the methods and the operations implemented by the terminal device may be alternatively implemented by a component (for example, a chip or a circuit) that may be used in the terminal device, and the methods and the operations implemented by the network device may be alternatively implemented by a component (for example, a chip or a circuit) that may be used in the network device.

The solutions provided in this application are mainly described above from a perspective of interaction between network elements. It may be understood that, to implement the foregoing functions, each network element includes a corresponding hardware structure and/or software module for implementing each function. A person skilled in the art should easily be aware that, in combination with the examples described in the embodiments disclosed in this specification, units and algorithm steps may be implemented by hardware or a combination of hardware and computer software in the present invention. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of the present invention.

Figure 3:
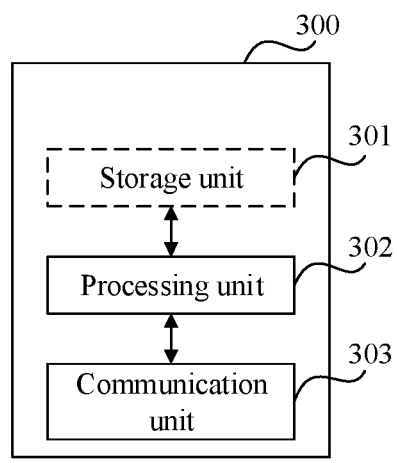
FIG. 3 is a schematic diagram of a structure of a communication apparatus according to an embodiment of this application.

FIG. 3 is a possible example block diagram of a communication apparatus according to this application. The apparatus 300 may exist in a form of software or hardware. The apparatus 300 may include a processing unit 302 and a communication unit 303. In an implementation, the communication unit 303 may include a receiving unit and a sending unit. The processing unit 302 is configured to control and manage an action of the apparatus 300. The communication unit 303 is configured to support the apparatus 300 in communicating with another network entity. The apparatus 300 may further include a storage unit 301, configured to store program code and data of the apparatus 300.

The processing unit 302 may be a processor or a controller, such as a general-purpose central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA), or another programmable logical device, a transistor logical device, a hardware component, or any combination thereof. The processing unit may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The storage unit 301 may be a memory. The communication unit 303 is an interface circuit of the apparatus, and is configured to receive a signal from another apparatus. For example, when the apparatus is implemented in a form of a chip, the communication unit 303 is an interface circuit used by the chip to receive a signal from another chip or apparatus, or is an interface circuit used by the chip to send a signal to another chip or apparatus.

The apparatus 300 may be the terminal device in any one of the foregoing embodiments, or may be a chip used in the terminal device. For example, when the apparatus 300 is a terminal device, the processing unit 302 may be, for example, a processor, and the communication unit 303 may be, for example, a transceiver. Optionally, the transceiver may include a radio frequency circuit, and the storage unit may be, for example, a memory. For example, when the apparatus 300 is a chip used in the terminal device, the processing unit 302 may be, for example, a processor, and the communication unit 303 may be, for example, an input/output interface, a pin, or a circuit. The processing unit 302 may execute computer-executable instructions stored in the storage unit. Optionally, the storage unit is a storage unit inside the chip, such as a register or a buffer. Alternatively, the storage unit may be a storage unit that is inside the terminal device and that is located outside the chip, such as a read-only memory (read-only memory, ROM), another type of static storage device that can store static information and instructions, or a random access memory (random access memory, RAM).

In an embodiment, the apparatus 300 may be the network device in any one of the foregoing embodiments, or may be a chip used in the network device. For example, when the apparatus 300 is a network device, the processing unit 302 may be, for example, a processor, and the communication unit 303 may be, for example, a transceiver.

In an embodiment, the apparatus 300 is a terminal device. The processing unit 302 is configured to: determine an initial seed parameter of a pseudo-random sequence, and generate the pseudo-random sequence based on the initial seed parameter, where the initial seed parameter is determined based on attribute information of the terminal device; and determine a cyclic shift value based on the pseudo-random sequence, and determine a reference signal based on the cyclic shift value.

The communication unit 303 is configured to send the reference signal to a network device.

In an embodiment, the apparatus 300 is a network device. The communication unit 303 is configured to receive a signal from a terminal device.

The processing unit 302 is configured to: determine an initial seed parameter of a pseudo-random sequence, and generate the pseudo-random sequence based on the initial seed parameter, where the initial seed parameter is determined based on attribute information of the terminal device; determine a cyclic shift value based on the pseudo-random sequence, and determine a reference signal based on the cyclic shift value; and detect a signal from the terminal device by using the reference signal.

In an embodiment, when the apparatus 300 is a terminal device or a network device, the following implementation methods are further included:

In a possible implementation method, the attribute information includes a root indicator of a ZC sequence used for determining the reference signal.

In a possible implementation method, the attribute information includes a sequence identifier of the reference signal.

In a possible implementation method, the cyclic shift value α determined based on the pseudo-random sequence meets the following formula:

$$\alpha = \frac{2\pi}{Z}((\alpha_{init} + n_{cs}(n_{s,f}^{\mu}, l)) \bmod Z),$$

where
$n_{cs}(n_{s,f}^{\mu}, l) = \sum_{m=0}^{T-1} 2^m c(T \cdot N_{symb}^{slot} n_{s,f}^{\mu} + T \cdot l + m)$, where m=0, 1, 2, ..., T−1; $n_{s,f}^{\mu}$ is a slot number, in a current system frame, of a slot in which the reference signal is sent; $N_{symb}^{slot}$ is a quantity of orthogonal frequency division multiplexing OFDM symbols in one slot; l is a symbol number, in a current slot, of a symbol in which the reference signal is sent, and $0 \leq l \leq N_{symb}^{slot} - 1$, where l=0 corresponds to a first symbol in the current slot; Z is a positive integer; $\alpha_{init}$ is a predefined initial cyclic shift value or an initial cyclic shift value configured by the network device; T is a positive integer; and c(•) is the pseudo-random sequence.

In a possible implementation method, the cyclic shift value α determined based on the pseudo-random sequence meets the following formula:

$$\alpha = \frac{2\pi}{Z}((\alpha_{init} + n_{cs}(n_{SRS})) \bmod Z),$$

where
$n_{cs}(n_{SRS}) = \sum_{m=0}^{T-1} 2^m c(T n_{SRS} + m)$, where m=0, 1, 2, ..., T−1; $n_{SRS}$ is a counting value of a reference signal counter; Z is a positive integer; $\alpha_{init}$ is a predefined initial cyclic shift value or an initial cyclic shift value configured by the network device; T is a positive integer; and c(•) is the pseudo-random sequence.

In a possible implementation method, the cyclic shift value α determined based on the pseudo-random sequence meets the following formula:

$$\alpha = \frac{2\pi}{Z}((\alpha_{init} + n_{cs}(N_{slot}^{frame,\mu}, n_f, n_{s,f}^{\mu}, L, T_{SRS})) \bmod Z), \text{ where}$$

$$n_{cs}(N_{slot}^{frame,\mu}, n_f, n_{s,f}^{\mu}, L, T_{SRS}) = \sum_{m=0}^{T-1} 2^m c\left(T\left\lfloor \frac{N_{slot}^{frame,\mu} n_f + n_{s,f}^{\mu} - L}{T_{SRS}} \right\rfloor + m\right),$$

where m=0, 1, 2, ..., T−1; $n_{s,f}^{\mu}$ is a slot number, in a current system frame, of a slot in which the reference signal is sent; $n_f$ is a system frame number; $N_{slot}^{frame,\mu}$ is a quantity of slots in each system frame; $T_{SRS}$ is a reference signal sending cycle; L is an integer; Z is a positive integer; $\alpha_{init}$ is a predefined initial cyclic shift value or an initial cyclic shift value configured by the network device; T is a positive integer; and c(•) is the pseudo-random sequence.

In a possible implementation method, the cyclic shift value α determined based on the pseudo-random sequence meets the following formula:

$$\alpha = \frac{2\pi}{Z}((\alpha_{init} + n_{cs}(N_{slot}^{frame,\mu}, n_f, n_{s,f}^{\mu}, l)) \bmod Z),$$

where $n_{cs}(N_{slot}^{frame,\ \mu}, n_f, n_{s,f}^{\mu}, l) = \sum_{m=0}^{T-1} 2^m c(TS(N_{slot}^{frame,\ \mu} n_f + n_{s,f}^{\mu}) + Tl + m)$, where m=0, 1, 2, ..., T−1; $n_{s,f}^{\mu}$ is a slot number, in a current system frame, of a slot in which the reference signal is sent; $n_f$ is a system frame number; $N_{slot}^{frame,\ \mu}$ is a quantity of slots in each system frame; l is a symbol number, in a current slot, of a symbol in which the reference signal is sent, and $0 \le l \le N_{symb}^{slot} - 1$, where l=0 corresponds to a first symbol in the current slot; Z is a positive integer; $\alpha_{init}$ is a predefined initial cyclic shift value or an initial cyclic shift value configured by the network device; T is a positive integer; S is a positive integer; and c(•) is the pseudo-random sequence.

In a possible implementation method, Z is $n_{RS}^{cs,\ max}$, and $n_{RS}^{cs,\ max}$ is a maximum cyclic shift value.

It may be understood that, for a specific implementation process and corresponding beneficial effects when the apparatus is used for the foregoing communication method, refer to related descriptions in the foregoing method embodiment. Details are not described herein again.

Figure 4:
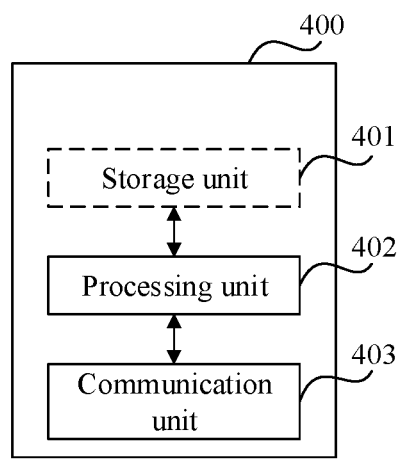
FIG. 4 is a schematic diagram of a structure of a communication apparatus according to an embodiment of this application.

FIG. 4 is a possible example block diagram of a communication apparatus according to this application. The apparatus 400 may exist in a form of software or hardware. The apparatus 400 may include a processing unit 402 and a communication unit 403. In an implementation, the communication unit 403 may include a receiving unit and a sending unit. The processing unit 402 is configured to control and manage an action of the apparatus 400. The communication unit 403 is configured to support the apparatus 400 in communicating with another network entity. The apparatus 400 may further include a storage unit 401, configured to store program code and data of the apparatus 400.

The processing unit 402 may be a processor or a controller, for example, a CPU, a general-purpose processor, a DSP, an ASIC, an FPGA or another programmable logic device, a transistor logic device, a hardware component, or any combination thereof. The processing unit may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The storage unit 401 may be a memory. The communication unit 403 is an interface circuit of the apparatus, and is configured to receive a signal from another apparatus. For example, when the apparatus is implemented in a form of a chip, the communication unit 403 is an interface circuit used by the chip to receive a signal from another chip or apparatus, or is an interface circuit used by the chip to send a signal to another chip or apparatus.

The apparatus 400 may be the network device in any one of the foregoing embodiments, or may be a chip used in the network device. For example, when the apparatus 400 is a network device, the processing unit 402 may be, for example, a processor, and the communication unit 403 may be, for example, a transceiver.

The apparatus 400 may be the terminal device in any one of the foregoing embodiments, or may be a chip used in the terminal device. For example, when the apparatus 400 is a terminal device, the processing unit 402 may be, for example, a processor, and the communication unit 403 may be, for example, a transceiver.

Optionally, the transceiver may include a radio frequency circuit, and the storage unit may be, for example, a memory. For example, when the apparatus 400 is a chip used in the network device, the processing unit 402 may be, for example, a processor, and the communication unit 403 may be, for example, an input/output interface, a pin, or a circuit. The processing unit 402 may execute computer-executable instructions stored in the storage unit. Optionally, the storage unit is a storage unit inside the chip, such as a register or a buffer. Alternatively, the storage unit may be a storage unit that is inside the network device and that is located outside the chip, for example, a ROM, another type of static storage device that can store static information and instructions, or a RAM.

In an embodiment, the apparatus 400 is a terminal device. The processing unit 402 is configured to: determine a cyclic shift value, where the cyclic shift value is determined based on a first frequency hopping parameter, the first frequency hopping parameter is determined from a first pattern based on information about a first time unit, and the first pattern includes at least two frequency hopping parameters; the cyclic shift value is determined based on a first cyclic shift step and the information about the first time unit; or the cyclic shift value is determined based on a first initial cyclic shift step, a first cyclic shift step gap, and the information about the first time unit, where the information about the first time unit includes a number of a system frame in which the first time unit is located and/or a slot number of a slot in which the first time unit is located, and the first time unit is a time unit for sending a reference signal; and determine the reference signal based on the cyclic shift value.

The communication unit 403 is configured to send the reference signal to a network device in the first time unit.

In an embodiment, the apparatus 400 is a network device. The communication unit 403 is configured to receive a signal from a terminal device.

The processing unit 402 is configured to: determine a cyclic shift value of a reference signal, where the cyclic shift value is determined based on a first frequency hopping parameter, the first frequency hopping parameter is determined from a first pattern based on information about a first time unit, and the first pattern includes at least two frequency hopping parameters; the cyclic shift value is determined based on a first cyclic shift step and the information about the first time unit; or the cyclic shift value is determined based on a first initial cyclic shift step, a first cyclic shift step gap, and the information about the first time unit, where the information about the first time unit includes a number of a system frame in which the first time unit is located and/or a slot number of a slot in which the first time unit is located, and the first time unit is a time unit for sending the reference signal; determine the reference signal based on the cyclic shift value; and detect a signal from the terminal device by using the reference signal.

In an embodiment, when the apparatus 400 is a terminal device or a network device, the following implementation methods are further included:

In a possible implementation, the first pattern is determined from X patterns, and X is a positive integer; or the first cyclic shift step is determined from Z cyclic shift steps, and Z is a positive integer; or the first initial cyclic shift step is determined from Z initial cyclic shift steps, and the first cyclic shift step gap is determined from Z cyclic shift step gaps.

In a possible implementation method, the first pattern is determined from X patterns according to first indication information, and the first indication information is sent by the network device to the terminal device; or the first cyclic shift step is determined from Z cyclic shift steps according to second indication information, and the second indication information is sent by the network device to the terminal device; or the first initial cyclic shift step is determined from Z initial cyclic shift steps according to third indication information, the third indication information is sent by the network device to the terminal device, the first cyclic shift step gap is determined from Z cyclic shift step gaps according to fourth indication information, and the fourth indication information is sent by the network device to the terminal device.

In a possible implementation method, the cyclic shift value is determined based on a first cyclic shift interval, the first cyclic shift interval is determined from the first pattern based on the information about the first time unit, the information about the first time unit includes the number of the system frame in which the first time unit is located and a slot number, in a current system frame, of the slot in which the first time unit is located, and the cyclic shift value α is determined based on λ, where λ meets the following formula:

$$\lambda = \frac{2\pi}{Z}\left(\left(\alpha_{init} + \beta \left\lfloor \frac{N_{slot}^{frame,\mu} n_f + n_{s,f}^{\mu} - L}{T_{SRS}} \right\rfloor_{mod Y}\right) mod Z\right), \text{ where}$$

$$\beta \left\lfloor \frac{N_{slot}^{frame,\mu} n_f + n_{s,f}^{\mu} - L}{T_{SRS}} \right\rfloor_{mod Y}$$

is the first cyclic shift interval; $N_{slot}^{frame,\mu}$ is a quantity of slots in each system frame; $n_f$ is a system frame number; $n_{s,f}^{\mu}$ is a slot number, in the current system frame, of a slot in which the reference signal is sent; L is an integer; $T_{SRS}$ is a reference signal sending cycle; Z is a positive integer; and $\alpha_{init}$ is a predefined initial cyclic shift value or an initial cyclic shift value configured by the network device.

In a possible implementation method, the cyclic shift value is determined based on the first cyclic shift step and the information about the first time unit, the information about the first time unit includes the number of the system frame in which the first time unit is located and a slot number, in a current system frame, of the slot in which the first time unit is located, and the cyclic shift value α is determined based on λ, where λ meets the following formula:

$$\lambda = \frac{2\pi}{Z}\left(\left(\alpha_{init} + \Delta hopping \times \left\lfloor \frac{N_{slot}^{frame,\mu} n_f + n_{s,f}^{\mu} - L}{T_{SRS}} \right\rfloor\right) mod Z\right),$$

Δhopping is the first cyclic shift step; $N_{slot}^{frame,\mu}$ is a quantity of slots in each system frame; $n_f$ is a system frame number; $n_{s,f}^{\mu}$ is a slot number, in the current system frame, of a slot in which the reference signal is sent; L is an integer; $T_{SRS}$ is a reference signal sending cycle; Z is a positive integer; and $\alpha_{init}$ is a predefined initial cyclic shift value or an initial cyclic shift value configured by the network device.

In a possible implementation method, the cyclic shift value is determined based on the first initial cyclic shift step, the first cyclic shift step gap, and the information about the first time unit, the information about the first time unit includes the number of the system frame in which the first time unit is located and a slot number, in a current system frame, of the slot in which the first time unit is located, and the cyclic shift value α is determined based on λ, where λ meets the following formula:

$$\lambda = \frac{2\pi}{Z}\left(\left(\alpha_{init} + \Delta h_{init} \times N_{T_{SRS}} + \Delta h_{gap} \times \frac{N_{T_{SRS}} \times (N_{T_{SRS}} - 1)}{2}\right) mod Z\right),$$

$$\text{where } N_{T_{SRS}} = \left\lfloor \frac{N_{slot}^{frame,\mu} n_f + n_{s,f}^{\mu} - L}{T_{SRS}} \right\rfloor$$

$N_{slot}^{frame,\mu}$ is a quantity of slots in each system frame; $n_f$ is a system frame number; $n_{s,f}^{\mu}$ is a slot number, in the current system frame, of a slot in which the reference signal is sent; L is an integer; $\Delta h_{init}$ is the first initial cyclic shift step; $\Delta h_{gap}$ is the first cyclic shift step gap; Z is a positive integer; $\alpha_{init}$ is a predefined initial cyclic shift value or an initial cyclic shift value configured by the network device; and $T_{SRS}$ is a reference signal sending cycle.

In a possible implementation method, Z is $n_{RS}^{cs, max}$, and $n_{RS}^{cs, max}$ is a maximum cyclic shift value.

It may be understood that the reference signal in this embodiment of this application is a downlink reference signal, such as a downlink DMRS and a phase tracking signal. In this case, the reference signal sending method provided in the embodiments of this application may be performed by the network device. Correspondingly, the signal detection method provided in the embodiments of this application may be performed by the terminal device.

Figure 5:
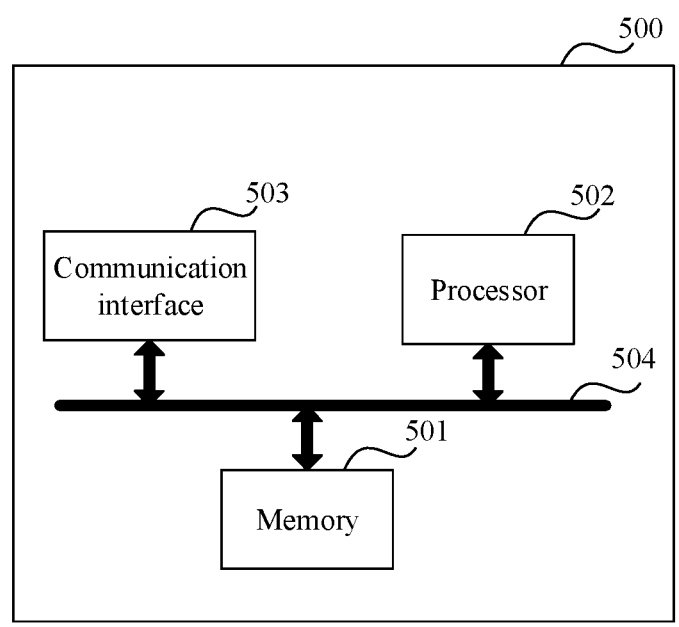
FIG. 5 is a schematic diagram of a structure of a communication apparatus according to an embodiment of this application.

FIG. 5 is a schematic diagram of a communication apparatus according to this application. The apparatus may be the terminal device or the network device in the foregoing embodiments. The apparatus 500 includes a processor 502, a communication interface 503, and a memory 501. Optionally, the apparatus 500 may further include a communication line 504. The communication interface 503, the processor 502, and the memory 501 may be connected to each other by using the communication line 504. The communication line 504 may be a peripheral component interconnect (peripheral component interconnect, PCI for short) bus, an extended industry standard architecture (extended industry standard architecture, EISA for short) bus, or the like. The communication line 504 may be classified into an address bus, a data bus, a control bus, and the like. For ease of representation, only one thick line is used to represent the bus in FIG. 5, but this does not mean that there is only one bus or only one type of bus.

The processor 502 may be a CPU, a microprocessor, an ASIC, or one or more integrated circuits configured to control program execution in the solutions of this application.

The communication interface 503 uses any apparatus like a transceiver, and is configured to communicate with another device or a communication network, such as the Ethernet, a radio access network (radio access network, RAN), a wireless local area network (wireless local area network, WLAN), or a wired access network.

The memory 501 may be a ROM, another type of static storage device that can store static information and instructions, a RAM, or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer, but is not limited thereto. The memory may exist independently and is connected to the processor by using the communication line 504. The memory may alternatively be integrated with the processor.

The memory 501 is configured to store computer-executable instructions for executing the solutions of this application, and the processor 502 controls the execution. The processor 502 is configured to execute the computer-executable instruction stored in the memory 501, to implement the communication method provided in FIG. 2 or FIG. 3 in the foregoing embodiments of this application. Optionally, the computer-executable instructions in this embodiment of this application may also be referred to as application program code. This is not specifically limited in this embodiment of this application.

A person of ordinary skill in the art may understand that various reference numerals such as "first" and "second" in this application are merely used for differentiation for ease of description, and are not used to limit a scope of the embodiments of this application, or represent a sequence. The term "and/or" describes an association relationship between associated objects and indicates that three relationships may exist. For example, A and/or B may indicate the following three cases: Only A exists, both A and B exist, and only B exists. The character "/" usually indicates an "or" relationship between the associated objects. "At least one" means one or more. At least two means two or more. "At least one", "any one", or a similar expression means any combination of these items, including a single item (piece) or any combination of a plurality of items (pieces). For example, at least one (piece or type) of a, b, or c may represent a, b, c, a and b, a and c, b and c, or a, b, and c, where a, b, and c may be in a singular or plural form. "A plurality of" means two or more, and another quantifier is similar to this. In addition, an element (element) appearing in singular forms "a", "an" and "the" does not mean "one or only one" but "one or more" unless otherwise specified in the context. For example, "a device" means one or more such devices.

A person skilled in the art should understand that the embodiments of this application may be provided as methods, systems, or computer program products. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

Clearly, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A reference signal sending method, comprising:
determining an initial seed parameter of a pseudo-random sequence, and generating the pseudo-random sequence based on the initial seed parameter, wherein the initial seed parameter is determined based on attribute information of a terminal device;
determining a cyclic shift value $\alpha$ based on the pseudo-random sequence, and determining a reference signal based on the cyclic shift value $\alpha$; and
sending the reference signal to a network device, wherein the cyclic shift value $\alpha$ determined based on the pseudo-random sequence meets one of the following formula:
$\alpha = 2\pi/Z \, ((\alpha_{init} + n_{CS}(n_{s,f}^{\mu}, 1)) \bmod Z)$, wherein
$n_{CS}(n_{s,f}^{\mu}, 1) = \Sigma_{m=0}^{T-1} 2^m c(T \cdot N_{symb}^{slot} n_{s,f}^{\mu} + T \cdot l + m)$,
wherein m=0, 1, 2, ..., T−1; $n_{s,f}^{\mu}$ is a slot number, in a current system frame, of a slot in which the reference signal is sent; $N_{symb}^{slot}$ is a quantity of orthogonal frequency division multiplexing (OFDM) symbols in one slot; l is a symbol number, in a current slot, of a symbol in which the reference signal is sent, and $0 \leq l \leq N_{symb}^{slot}-1$, wherein l=0 corresponds to a first symbol in the current slot; Z is a positive integer; $\alpha_{init}$ is a predefined initial cyclic shift value or an initial cyclic shift value configured by the network device; T is a positive integer; and c(•) is the pseudo-random sequence;
$\alpha = 2\pi/Z \, ((\alpha_{init} + n_{CS}(n_{SRS})) \bmod Z)$, wherein
$n_{cs}(n_{SRS}) = \Sigma_{m=0}^{T-1} 2^m c(T n_{SRS} + m)$, where m=0, 1, 2, ..., T−1; $n_{SRS}$ is a counting value of a reference signal counter; Z is a positive integer; $\alpha_{init}$ is a predefined initial cyclic shift value or an initial cyclic shift value configured by the network device; T is a positive integer; and c(•) is the pseudo-random sequence;
$\alpha = 2\pi/Z \, ((\alpha_{init} + n_{CS}(N_{slot}^{frame,\mu}, n_f, n_{s,f}^{\mu}, L, T_{SRS})) \bmod Z)$, wherein
$n_{CS}(N_{slot}^{frame,\mu}, n_f, n_{s,f}^{\mu}, L, T_{SRS}) = \Sigma_{m=0}^{T-1} 2^m c(T \lfloor N_{slot}^{frame,\mu} n_f + n_{s,f}^{\mu} - L/T_{SRS} \rfloor + m)$, wherein m=0, 1, 2, ..., T−1; $n_{s,f}^{\mu}$ is a slot number, in a current system frame, of a slot in which the reference signal is sent; $n_f$ is a system frame number; $N_{slot}^{frame,\mu}$ is a quantity pf slots in each system frame; $T_{SRS}$ is a reference signal sending cycle; L is an integer; Z is a positive integer; $\alpha_{init}$ is a predefined initial cyclic shift value or an initial cyclic shift value configured by the network device; T is a positive integer; and c(•) is the pseudo-random sequence; or $\alpha = 2\pi/Z \ ((\alpha_{int} + n_{CS} \ (N_{slot}^{frame, \ \mu}, \ n_f, \ n_{s,f}^{\mu}, \ l)) \bmod Z)$, wherein $n_{CS} \ (N_{slot}^{frame, \ \mu}, \ n_f, \ n_{s,f}^{\mu}, \ l) = \Sigma_{m=0}^{T-1} 2^m c(TS \ (N_{slot}^{frame, \ \mu} n_f + n_{s,f}^{\mu}) + Tl + m)$, wherein $m = 0, 1, 2, \ldots, T-1$; $n_{s,f}^{\mu}$ is a slot number, in a current system frame, of a slot in which the reference signal is sent; $n_f$ is a system frame number; $N_{slot}^{frame, \ \mu}$ is a quantity of slots in each system frame; l is a symbol number, in a current slot, of a symbol in which the reference signal is sent, and $0 \le l \le N_{symb}^{slot} - 1$, wherein $l = 0$ corresponds to a first symbol in the current slot; Z is a positive integer; $\alpha_{init}$ is a predefined initial cyclic shift value or an initial cyclic shift value configured by the network device; T is a positive integer; S is a positive integer; c(•) is the pseudo-random sequence.

2. The method according to claim 1, wherein the attribute information comprises a root indicator of a Zadoff-Chu (ZC) sequence used for determining the reference signal.

3. The method according to claim 1, wherein the attribute information comprises a sequence identifier of the reference signal.

4. The method according to claim 1, wherein Z is $n_{RS}^{cs, \ max}$, and $n_{RS}^{cs, \ max}$ is a maximum cyclic shift value.

5. A signal detection method, comprising:
determining an initial seed parameter of a pseudo-random sequence, and generating the pseudo-random sequence based on the initial seed parameter, wherein the initial seed parameter is determined based on attribute information of a terminal device;
determining a cyclic shift value α based on the pseudo-random sequence, and determining a reference signal based on the cyclic shift value α; and
detecting a signal from the terminal device by using the reference signal, wherein the cyclic shift value α determined based on the pseudo-random sequence meets one of the following formula:

$\alpha = 2\pi/Z \ ((\alpha_{int} + n_{CS} \ (n_{s,f}^{\mu}, \ l)) \bmod Z)$, wherein
$n_{cs}(n_{s,f}^{\mu}, \ l) = \Sigma_{m=0}^{T-1} 2^m c(T \cdot N_{symb}^{slot} n_{s,f}^{\mu} + T \cdot l + m)$, where $m = 0, 1, 2, \ldots, T-1$; $n_{s,f}^{\mu}$ is a slot number, in a current system frame, of a slot in which the reference signal is sent; $N_{symb}^{slot}$ is a quantity of OFDM symbols in one slot; l is a symbol number, in a current slot, of a symbol in which the reference signal is sent, and $0 \le l \le N_{symb}^{slot} - 1$, wherein $l = 0$ corresponds to a first symbol in the current slot; Z is a positive integer; $\alpha_{init}$ is a predefined initial cyclic shift value or an initial cyclic shift value configured by a network device; T is a positive integer; and c(•) is the pseudo-random sequence;

$\alpha = 2\pi/Z \ ((\alpha_{int} + n_{CS} \ (n_{SRS})) \bmod Z)$, wherein
$n_{cs}(n_{SRS}) = \Sigma_{m=0}^{T-1} 2^m c(T n_{SRS} + m)$, where $m = 0, 1, 2, \ldots, T-1$; $n_{SRS}$ is a counting value of a reference signal counter; Z is a positive integer; $\alpha_{init}$ is a predefined initial cyclic shift value or an initial cyclic shift value configured by the network device; T is a positive integer; and c(•) is the pseudo-random sequence;

$\alpha = 2\pi/Z \ ((\alpha_{int} + n_{CS} \ (N_{slot}^{frame, \mu}, \ n_f, \ n_{s,f}^{\mu}, \ L, \ T_{SRS})) \bmod Z)$, wherein
$n_{CS} \ (N_{slot}^{frame, \mu}, \ n_f, \ n_{s,f}^{\mu}, \ L, \ T_{SRS}) = \Sigma_{m=0}^{T-1} 2^m c(T \lfloor N_{slot}^{frame, \mu} n_f + n_{s,f}^{\mu} - L/T_{SRS} \rfloor + m)$, wherein $m = 0, 1, 2, \ldots, T-1$; $n_{s,f}^{\mu}$ is a slot number, in a current system frame, of a slot in which the reference signal is sent; $n_f$ is a system frame number; $N_{slot}^{frame, \mu}$ is a quantity of slots in each system frame; $T_{SRS}$ is a reference signal sending cycle; L is an integer; Z is a positive integer;

$\alpha_{init}$ is a predefined initial cyclic shift value or an initial cyclic shift value configured by the network device; T is a positive integer; and c(•) is the pseudo-random sequence; or $\alpha = 2\pi/Z \ ((\alpha_{int} + n_{CS} \ (N_{slot}^{frame, \ \mu}, \ n_f, \ n_{s,f}^{\mu}, \ l)) \bmod Z)$, wherein $n_{CS} \ (N_{slot}^{frame, \ \mu}, \ n_f, \ n_{s,f}^{\mu}, \ l) = \Sigma_{m=0}^{T-1} 2^m c(TS \ (N_{slot}^{frame, \ \mu} n_f + n_{s,f}^{\mu}) + Tl + m)$, wherein $m = 0, 1, 2, \ldots, T-1$; $n_{s,f}^{\mu}$ is a slot number, in a current system frame, of a slot in which the reference signal is sent; $n_f$ is a system frame number; $N_{slot}^{frame, \ \mu}$ is a quantity of slots in each system frame; l is a symbol number, in a current slot, of a symbol in which the reference signal is sent, and $0 \le l \le N_{symb}^{slot} - 1$, wherein $l = 0$ corresponds to a first symbol in the current slot; Z is a positive integer; $\alpha_{init}$ is a predefined initial cyclic shift value or an initial cyclic shift value configured by the network device; T is a positive integer; S is a positive integer; and c(•) is the pseudo-random sequence.

6. The method according to claim 5, wherein the attribute information comprises a root indicator of a Zadoff-Chu (ZC) sequence used for determining the reference signal.

7. The method according to claim 5, wherein the attribute information comprises a sequence identifier of the reference signal.

8. The method according to claim 5, wherein Z is $n_{RS}^{cs, \ max}$, and $n_{RS}^{cs, \ max}$ is a maximum cyclic shift value.

9. A communication apparatus, comprising one or more processors and a memory, wherein the memory stores a computer program for execution by the one or more processors to perform operations comprising:
determining an initial seed parameter of a pseudo-random sequence, and generating the pseudo-random sequence based on the initial seed parameter, wherein the initial seed parameter is determined based on attribute information of a terminal device;
determining a cyclic shift value α based on the pseudo-random sequence, and determining a reference signal based on the cyclic shift value α; and
sending the reference signal to a network device, wherein the cyclic shift value α determined based on the pseudo-random sequence meets one of the following formula:

$\alpha = 2\pi/Z \ ((\alpha_{int} + n_{CS} \ (n_{s,f}^{\mu}, \ l)) \bmod Z)$, wherein
$n_{cs}(n_{s,f}^{\mu}, \ l) = \Sigma_{m=0}^{T-1} 2^m c(T \cdot N_{symb}^{slot} n_{s,f}^{\mu} + T \cdot l + m)$, wherein $m = 0, 1, 2, \ldots, T-1$; $n_{s,f}^{\mu}$ is a a slot number, in a current system frame, of a slot in which the reference signal is sent; $N_{symb}^{slot}$ is a quantity of OFDM symbols in one slot; l is a symbol number, in a current slot, of a symbol in which the reference signal is sent, and $0 \le l \le N_{symb}^{slot} - 1$, wherein $l = 0$ corresponds to a first symbol in the current slot; Z is a positive integer; $\alpha_{init}$ is a predefined initial cyclic shift value or an initial cyclic shift value configured by the network device; T is a positive integer; and c(•) is the pseudo-random sequence;

$\alpha = 2\pi/Z \ ((\alpha_{int} + n_{CS} \ (n_{SRS})) \bmod Z)$, wherein
$n_{cs}(n_{SRS}) = \Sigma_{m=0}^{T-1} 2^m c(T n_{SRS} + m)$, where $m = 0, 1, 2, \ldots, T-1$; $n_{SRS}$ is a counting value of a reference signal counter; Z is a positive integer; $\alpha_{init}$ is a predefined initial cyclic shift value or an initial cyclic shift value configured by the network device; T is a positive integer; and c(•) is the pseudo-random sequence;

$\alpha = 2\pi/Z \ ((\alpha_{int} + n_{CS} \ (N_{slot}^{frame, \ \mu}, \ n_f, \ n_{s,f}^{\mu}, \ L, \ T_{SRS})) \bmod Z)$, wherein $n_{CS} \ (N_{slot}^{frame, \mu}, \ n_f, \ n_{s,f}^{\mu}, \ L, \ T_{SRS}) = \Sigma_{m=0}^{T-1} 2^m c(T \lfloor N_{slot}^{frame, \mu} n_f + n_{s,f}^{\mu} - L/T_{SRS} \rfloor + m)$, wherein $m = 0, 1, 2, \ldots, T-1$; $n_{s,f}^{\mu}$ is a slot number, in a current system frame, of a slot in which the reference signal is sent; $n_f$ is a system frame number; $N_{slot}^{frame,\mu}$ is a quantity pf slots in each system frame; $T_{SRS}$ is a reference signal sending cycle; L is an integer; Z is a positive integer; $\alpha_{init}$ is a predefined initial cyclic shift value or an initial cyclic shift value configured by the network device; T is a positive integer; and $c(\bullet)$ is the pseudo-random sequence; or $\alpha=2\pi/Z\ ((\alpha_{init}+n_{CS}\ (N_{slot}^{frame,\mu},\ n_f,\ n_{s,f}^{\mu},\ 1))\mod Z)$, wherein $n_{CS}\ (N_{slot}^{frame,\mu},\ n_f,\ n_{s,f}^{\mu},\ 1)=\Sigma_{m=0}^{T-1}2^m c(TS\ (N_{slot}^{frame,\mu}n_f+n_{s,f}^{\mu})+Tl+m)$, wherein m=0, 1, 2, . . . , T−1; $n_{s,f}^{\mu}$ is a slot number, in a current system frame, of a slot in which the reference signal is sent; $n_f$ is a system frame number; $N_{slot}^{frame,\mu}$ is a quantity of slots in each system frame; l is a symbol number, in a current slot, of a symbol in which the reference signal is sent, and $0\leq l\leq N_{symb}^{slot}-1$, wherein l=0 corresponds to a first symbol in the current slot; Z is a positive integer; $\alpha_{init}$ is a predefined initial cyclic shift value or an initial cyclic shift value configured by the network device; T is a positive integer; S is a positive integer; $c(\bullet)$ is the pseudo-random sequence.

10. The apparatus according to claim 9, wherein the attribute information comprises a root indicator of a Zadoff-Chu (ZC) sequence used for determining the reference signal.

11. The apparatus according to claim 9, wherein the attribute information comprises a sequence identifier of the reference signal.

12. The apparatus according to claim 9, wherein Z is $n_{RS}^{cs,\ max}$, and $n_{RS}^{cs,\ max}$ is a maximum cyclic shift value.

13. A communication apparatus, comprising one or more processors and a memory, wherein the memory stores a computer program for execution by the one or more processors to perform operations comprising:

determining an initial seed parameter of a pseudo-random sequence, and generating the pseudo-random sequence based on the initial seed parameter, wherein the initial seed parameter is determined based on attribute information of a terminal device;

determining a cyclic shift value α based on the pseudo-random sequence, and determining a reference signal based on the cyclic shift value α; and detecting a signal from the terminal device by using the reference signal, wherein the cyclic shift value α determined based on the pseudo-random sequence meets one of the following formula:

$\alpha=2\pi/Z\ ((\alpha_{init}+n_{CS}\ (n_{s,f}^{\mu},\ 1))\mod Z)$, wherein $n_{CS}\ (n_{s,f}^{\mu},\ 1)=\Sigma_{m=0}^{T-1}2^m c(T \cdot N_{symb}^{slot}n_{s,f}^{\mu}+T\cdot l+m)$, wherein m=0, 1, 2, . . . , T−1; $n_{s,f}^{\mu}$ is a slot number, in a current system frame, of a slot in which the reference signal is sent; $N_{symb}^{slot}$ is a quantity of OFDM symbols in one slot; l is a symbol number, in a current slot, of a symbol in which the reference signal is sent, and $0\leq l\leq N_{symb}^{slot}-1$, wherein l=0 corresponds to a first symbol in the current slot; Z is a positive integer; $\alpha_{init}$ is a predefined initial cyclic shift value or an initial cyclic shift value configured by the network device; T is a positive integer; and $c(\bullet)$ is the pseudo-random sequence;

$\alpha=2\pi/Z\ ((\alpha_{init}+n_{CS}\ (n_{SRS}))\mod Z)$, wherein $n_{CS}(n_{SRS})=\Sigma_{m=0}^{T-1}2^m c(Tn_{SRS}+m)$, where m=0, 1, 2, . . . , T−1; $n_{SRS}$ is a counting value of a reference signal counter; Z is a positive integer; $\alpha_{init}$ is a predefined initial cyclic shift value or an initial cyclic shift value configured by the network device; T is a positive integer; and $c(\bullet)$ is the pseudo-random sequence;

$\alpha=2\pi/Z\ ((\alpha_{init}+n_{CS}\ (N_{slot}^{frame,\mu},\ n_f,\ n_{s,f}^{\mu},\ L,\ T_{SRS}))\mod Z)$, wherein $n_{CS}\ (N_{slot}^{frame,\mu},\ n_f,\ n_{s,f}^{\mu},\ L,\ T_{SRS})=\Sigma_{m=0}^{T-1}2^m c(T\lfloor N_{slot}^{frame,\mu}n_f+n_{s,f}^{\mu}-L/T_{SRS}\rfloor+m)$, wherein m=0, 1, 2, . . . , T−1; $n_{s,f}^{\mu}$ is a slot number, in a current system frame, of a slot in which the reference signal is sent; $n_f$ is a system frame number; $N_{slot}^{frame,\mu}$ is a quantity of slots in each system frame; l is a symbol number, in a current slot, of a symbol in which the reference signal is sent, and $0\leq l\leq N_{symb}^{slot}-1$, wherein l=0 corresponds to a first symbol in the current slot; Z is a positive integer; $\alpha_{init}$ is a predefined initial cyclic shift value or an initial cyclic shift value configured by the network device; T is a positive integer; and $c(\bullet)$ is the pseudo-random sequence; or $\alpha=2\pi/Z\ ((\alpha_{init}+n_{CS}\ (n_{slot}^{frame,\mu},\ n_f+n_{s,f}^{\mu},\ 1))\mod Z)$, wherein $n_{CS}(N_{slot}^{frame,\mu},\ n_f,\ n_{s,f}^{\mu},\ 1)=\Sigma_{m=0}^{T-1}2^m c(TS\ (N_{slot}^{frame,\mu}n_f+n_{s,f}^{\mu})+Tl+m)$, wherein m=0, 1, 2, . . . , T−1; $n_{s,f}^{\mu}$ is a a slot number, in a current system frame, of a slot in which the reference signal is sent; $n_f$ is system frame numer; $N_{slot}^{frame,\mu}$ is a quantity of slots in each system frame; l is a symbol number, in a current slot, of a symbol in which the reference signal is sent, and $0\leq l\leq N_{symb}^{slot}-1$, wherein l=0 corresponds to a first symbol in the current slot; Z is a positive integer; $\alpha_{init}$ is a predefined initial cyclic shift value or an initial cyclic shift value configured by the network device; T is a positive integer; S is a positice integer; and $c(\bullet)$ is the pseudo-random sequence.

14. The apparatus according to claim 13, wherein the attribute information comprises a root indicator of a Zadoff-Chu (ZC) sequence used for determining the reference signal.

15. The apparatus according to claim 13, wherein the attribute information comprises a sequence identifier of the reference signal.

16. The apparatus according to claim 13, wherein Z is $n_{RS}^{cs,\ max}$, and $n_{rs}^{cs,\ max}$ is a maximum cyclic shift value.

* * * * *

UNITED STATES PATENT AND TRADEMARK OFFICE
CERTIFICATE OF CORRECTION

PATENT NO. : 11,882,071 B2
APPLICATION NO. : 17/690738
DATED : January 23, 2024
INVENTOR(S) : Yi Wei et al.

Page 1 of 2

It is certified that error appears in the above-identified patent and that said Letters Patent is hereby corrected as shown below:

In the Claims

Column 32, Line 37, Claim 1, please delete "$((\alpha_{int}+$" and insert therefore -- $((\alpha_{init}+$ --;

Column 32, Line 51, Claim 1, please delete "$((\alpha_{int}+$" and insert therefore -- $((\alpha_{init}+$ --;

Column 32, Line 52, Claim 1, please delete "where" and insert therefore -- wherein --;

Column 32, Line 58, Claim 1, please delete "$((\alpha_{int}+$" and insert therefore -- $((\alpha_{init}+$ --;

Column 32, Line 64, Claim 1, please delete "pf" and insert therefore -- of --;

Column 33, Line 4, Claim 1, please delete "$((\alpha_{int}+$" and insert therefore -- $((\alpha_{init}+$ --;

Column 33, Line 17, Claim 1, before "c(•)" insert therefore -- and --;

Column 33, Line 40, Claim 5, please delete "$((\alpha_{int}+$" and insert therefore -- $((\alpha_{init}+$ --;

Column 33, Line 41, Claim 5, please delete "where" and insert therefore -- wherein --;

Column 33, Line 52, Claim 5, please delete "$((\alpha_{int}+$" and insert therefore -- $((\alpha_{init}+$ --;

Column 33, Line 53, Claim 5, please delete "where" and insert -- wherein --;

Column 33, Line 59, Claim 5, please delete "$((\alpha_{int}+$" and insert therefore -- $((\alpha_{init}+$ --;

Column 34, Line 5, Claim 5, please delete "$((\alpha_{int}+$" and insert therefore -- $((\alpha_{init}+$ --;

Column 34, Line 43, Claim 9, please delete "$((\alpha_{int}+$" and insert therefore -- $((\alpha_{init}+$ --;

Signed and Sealed this
Twenty-fifth Day of June, 2024

Katherine Kelly Vidal
*Director of the United States Patent and Trademark Office*

CERTIFICATE OF CORRECTION (continued)
U.S. Pat. No. 11,882,071 B2

Column 34, Line 45, Claim 9, please delete "a a" and insert therefore -- a --;

Column 34, Line 50, Claim 9, please delete "-1 ," and insert therefore -- -1, --;

Column 34, Line 56, Claim 9, please delete "(($\alpha_{int}$+" and insert therefore -- (($\alpha_{init}$+ --;

Column 34, Line 57, Claim 9, please delete "where" and insert -- wherein --;

Column 34, Line 63, Claim 9, please delete "(($\alpha_{int}$+" and insert therefore -- (($\alpha_{init}$+ --;

Column 35, Line 2, Claim 9, please delete "pf" and insert therefore -- of --;

Column 35, Line 9, Claim 9, please delete "(($\alpha_{int}$+" and insert therefore -- (($\alpha_{init}$+ --;

Column 35, Line 22, Claim 9, before "c(•)" insert therefore -- and --;

Column 35, Line 49, Claim 13, please delete "(($\alpha_{int}$+" and insert therefore -- (($\alpha_{init}$+ --;

Column 36, Line 8, Claim 13, please delete "(($\alpha_{int}$+" and insert therefore -- (($\alpha_{init}$+ --;

Column 36, Line 9, Claim 13, please delete "where" and insert -- wherein --;

Column 36, Line 15, Claim 13, please delete "(($\alpha_{int}$+" and insert therefore -- (($\alpha_{init}$+ --;

Column 36, Line 22-25, Claim 13, please delete "l is a symbol number, in a current slot, of a symbol in which the reference signal is sent, and 0≤l≤Nsymb slot–1, wherein l=0 corresponds to a first symbol in the current slot;" and insert therefore -- TSRS is a reference signal sending cycle; L is an integer; --;

Column 36, Line 30, Claim 13, please delete "(($\alpha_{int}$+" and insert therefore -- (($\alpha_{init}$+ --;

Column 36, Line 34, Claim 13, please delete "a a" and insert therefore -- a --;

Column 36, Line 36, Claim 13, please delete "numer;" and insert therefore -- number; --;

Column 36, Line 43, Claim 13, please delete "positice" and insert therefore -- positive --.